United States Patent
Shaposhnikov

(10) Patent No.: US 9,910,682 B2
(45) Date of Patent: Mar. 6, 2018

(54) SIMULTANEOUS WEBSITE AND MOBILE APP CREATION METHOD AND SYSTEM

(71) Applicant: FRANDME, INC., Aventura, FL (US)

(72) Inventor: Dimitry Shaposhnikov, Hallandale, FL (US)

(73) Assignee: FRANDME, INC., Aventura, FL (US)

(*) Notice: Subject to any disclaimer, the term of this patent is extended or adjusted under 35 U.S.C. 154(b) by 0 days.

(21) Appl. No.: 15/339,358

(22) Filed: Oct. 31, 2016

(65) Prior Publication Data

US 2017/0147364 A1    May 25, 2017

Related U.S. Application Data

(60) Provisional application No. 62/285,463, filed on Oct. 29, 2015.

(51) Int. Cl.
| | | |
|---|---|---|
| *G06F 17/24* | (2006.01) | |
| *G06F 9/44* | (2018.01) | |
| *G06F 17/30* | (2006.01) | |
| *G06F 17/22* | (2006.01) | |

(52) U.S. Cl.
CPC .............. *G06F 9/4443* (2013.01); *G06F 8/34* (2013.01); *G06F 17/2247* (2013.01); *G06F 17/248* (2013.01); *G06F 17/3089* (2013.01)

(58) Field of Classification Search
CPC .............. G06F 17/2247; G06F 17/248; G06F 17/3089; G06F 9/4443; G06F 8/34
See application file for complete search history.

(56) References Cited

U.S. PATENT DOCUMENTS

| | | | | |
|---|---|---|---|---|
| 2008/0052630 A1* | 2/2008 | Rosenbaum | ........ | G06F 17/3082 715/738 |
| 2010/0161831 A1* | 6/2010 | Haas | ........ | G06F 15/173 709/235 |
| 2010/0185720 A1* | 7/2010 | Ryu | ........ | G06Q 10/10 709/203 |
| 2010/0199197 A1* | 8/2010 | Faletski | ........ | G06F 17/30905 715/760 |
| 2013/0159892 A1* | 6/2013 | Suraj | ........ | G06F 3/048 715/762 |
| 2013/0326333 A1* | 12/2013 | Hashmi | ........ | G06F 17/2247 715/234 |
| 2014/0164905 A1* | 6/2014 | Bruce | ........ | G06F 17/30905 715/234 |
| 2015/0302006 A1* | 10/2015 | Sasidharan | ........ | G06F 17/3002 707/741 |
| 2016/0179769 A1* | 6/2016 | Gershom | ........ | G06F 17/30345 715/235 |

* cited by examiner

*Primary Examiner* — Thu Huynh
(74) *Attorney, Agent, or Firm* — Johnson | Dalal; Mark C. Johnson

(57) ABSTRACT

A method of simultaneously creating a website and an app including providing, at the at least one server, a first coding template operably configured to create a website and a second coding template operably configured to create a mobile app; receiving a client selection of one of a plurality of pre-determined website-app templates stored at the at least one server; and creating a channel including the website and the corresponding mobile app by executing the first code template to create the website and simultaneously executing the second coding template to create the corresponding mobile app with the client-selected one of the plurality of pre-determined website-app templates being an input to each of the first and second coding templates.

20 Claims, 30 Drawing Sheets

300

800

900

1100

1400

1500

1600

1700

1800

1100

1100

1100

1100

2300

2302

2400

2500

2600

2800

900

2900

SIMULTANEOUS WEBSITE AND MOBILE APP CREATION METHOD AND SYSTEM

CROSS-REFERENCE TO RELATED APPLICATION

This application claims priority to U.S. Provisional Patent Application No. 62/285,463 filed Oct. 29, 2015, the entirety of which is incorporated by reference.

FIELD OF THE INVENTION

The present invention relates generally to website and mobile application (hereinafter "mobile app" or simply "app") creation systems and methods, and, more particularly, relates to systems and methods for simultaneously creating a website and a corresponding mobile app.

BACKGROUND OF THE INVENTION

The proliferation of the Internet has resulted in an increased demand for the creation of websites. In fact, some would argue that businesses, in particular, require a website in order to be relevant and competitive as a business's website is often a first point of contact for many potential customers. A website typically includes a collection of web pages in HTML format, with each page including content, such as graphics, images, text, icons, links, buttons, menus, and/or multi-media content, such as videos and audio. Creating a website typically requires generating a plurality of web pages using HTML and/or other coding languages and scripts, such as Java, PHP, ASP, and the like. Similarly, mobile apps also employ HTML or other coding languages for their creation. Adding user-content to the website once created, or modifying the website after its creation, also involves using HTML and/or other coding languages and scripts. This makes creating a website very difficult for the average individual without HTML or other software development and/or specialized technical knowledge and/or experience.

One existing solution is to hire a website developer with such software development experience. Unfortunately, doing so can be very costly and time-consuming. Another difficulty with such solution is that the website owner is required to contact the software developer for any modifications to the website after its creation, which can also become costly and time-consuming, creating a bottleneck in the website modification process. Accordingly, some website owners may be discouraged from updating and otherwise modifying their website to stay relevant, publish new content, and continue to attract new viewers.

Another existing solution is to purchase a website development tool. There are many commercially available website development tools that allow individuals to create and edit web pages without requiring the individuals to possess HTML knowledge. Unfortunately, existing website development tools are often very complicated and still require a significant amount of time and effort to learn how to use in order to create and modify a website. Although HTML knowledge may not be required in such solutions, there is still typically a fairly steep learning curve to be overcome in order to be able to create a website using such tools. Individuals without the time, technical experience, and/or the computer literacy to utilize existing website development tools may be required to either hire a website developer, or forego the website altogether.

Mobile technology is also rapidly developing, increasing the demand for mobile apps that can exploit the new and expanded functionality offered by mobile devices, such as smartphones and computer tablets. As a result, entire new software development communities have arisen to contribute to the expanding pool of mobile apps available for use on mobile devices. Major manufacturers of mobile hardware and software have released software development platforms to the general public and/or provided access to mobile app distribution services. To the general public's benefit, an extremely wide array of mobile apps are available for download, quick installation, and implementation on mobile devices, via mobile communication networks, such as, cellular networks and the Internet. Accordingly, mobile apps are very popular.

As with websites, creating mobile apps typically requires a special programming skill set that many individuals do not possess. Accordingly, similar to the creation of a website, existing solutions for individuals without such skill a set to create a mobile app include hiring a mobile app developer, or utilizing existing mobile app development platforms that require a significant amount of time and a high-level of computer literacy to utilize.

Moreover, there is currently no tool available for simultaneous creation of both a website and a mobile app. Specifically, there is currently no existing platform in which the same set of user inputs can be used, via a single user interface, to simultaneously create, much less update, both a website and a corresponding mobile app. Existing solutions include separately creating the website and the mobile app. This exponentially increases the amount of time and resources required for an individual to have both a website and a mobile app. The result of this is that many individuals and/or businesses forego the mobile app and instead provide only a website, rather than dealing with the separate development of both. Unfortunately, this reduces the amount of potential connections to end-users for such individuals and/or businesses. Moreover, there are also no known tools that permit users to simultaneously publish a website, yet make it undiscoverable to the general public unless certain permissions and/or procedures are followed.

Further, an RSS feed is a format for delivering regularly changing web content to subscribers. Many news-related sites, web blogs, and other online publishers provide RSS feeds to keep their subscribers up-to-date on the latest content. However, there is currently no system or method for automatically updating subscribers as a result of non-user-content related updates to the website, such as, for example, editing a color of the website, or changing the website's background layout.

Therefore, a need exists to overcome the problems with the prior art as discussed above.

SUMMARY OF THE INVENTION

The invention provides a simultaneous website and mobile app creation system and method that overcomes the hereinafore-mentioned disadvantages of the heretofore-known devices and methods of this general type.

With the foregoing and other objects in view, there is provided, in accordance with the invention, a computer-implemented method of simultaneously creating a website and an app, the method including providing, at at least one server, a first coding template operably configured to create a website and a second coding template operably configured to create a mobile app; receiving, by the server, a selection of a selected template from a plurality of pre-determined website-app templates selectable by a channel owner-developer to create and open for editing an instance of a website-app user application editing interface; creating, by the server executing the first coding template, a website based on the on the selected template; and simultaneously with the step of creating the website, creating, by the server executing the second coding template, a mobile app based on the selected template, the website and the mobile app being simultaneously editable via the website-app user application editing interface.

In accordance with another feature, an embodiment of the present invention further includes the server automatically hosting the website and the mobile app.

In accordance with yet another feature, an embodiment of the present invention further includes the server creating a channel including the website and the mobile app, the channel operably configured to automatically send a notification to member end-users of the channel as a result of an edit to the channel via the website-app user application editing interface, wherein the edit to the channel is automatically and simultaneously applied to the website and the mobile app included in the channel.

In accordance with another feature of the present invention, the website-app user application editing interface displays a plurality of editing features disposed to allow the channel owner-developer to edit the channel via user-inputs into at least one of the plurality of editing features displayed by the website-app user application editing interface; and the edit to the channel that is automatically and simultaneously applied to the website and the mobile app corresponds to the user-inputs into the at least one of the plurality of editing features.

In accordance with another feature, an embodiment of the present invention includes the server receiving a channel name from a channel owner-developer; and the steps of creating the website and simultaneously creating the mobile app further includes the server creating a channel including the website and the mobile app and associating the channel name to the channel such that the channel name is searchable via a search engine.

In accordance with yet another feature, an embodiment of the present invention further includes the server receiving a username and a password associated with an account of the channel owner-developer; the server associating the website and the mobile app with the account of the channel owner-developer accessed by the username and the password; and after the steps of creating the website and simultaneously creating the mobile app: receiving, by the server, a selection of a second selected template from the plurality of pre-determined website-app templates selectable by the channel owner-developer to create and open for editing a second instance of a website-app user application editing interface; creating, by the server executing the first coding template, a second website based on the second selected template; simultaneously with the step of creating the second website, creating, by the server executing the second coding template, a second mobile app based on the second selected template, the website and the mobile app being simultaneously editable via the second instance of the website-app user application editing interface; and associating the second website and the second mobile app with the account of the channel owner-developer such that the account of the channel owner-developer is associated with a first channel and a second channel, the first channel including the website and the mobile app and being independent from the second channel, the second channel including the second website and the second mobile app.

In accordance with yet another feature, an embodiment of the present invention further includes simultaneously publishing, by the server, the website and the corresponding mobile app.

In accordance with yet another feature, an embodiment of the present invention includes creating, by the server, a channel including the website and the mobile app, the channel operably configured to be associated with a plurality of channel member end-users and to automatically send a notification to each of the plurality of channel member end-users as a result of an edit to the channel made by the channel owner-developer via the website-app user application editing interface; and wherein the channel is operably configured such that the website and the mobile app are non-editable by the plurality of channel member end-users.

In accordance with yet another feature, an embodiment of the present invention further includes creating, by the server, a channel including the website and the mobile app; and after the steps of creating the website and simultaneously creating the mobile app, receiving, by the server, an indication to de-select simultaneous website and mobile app creation such that a subsequent request to create a second channel results in a creation of one of a second website and a second mobile app.

In accordance with yet another feature, an embodiment of the present invention further includes creating, by the server, a channel including the website and the mobile app; receiving, by the server, an indication of a stealth mode setting from a channel owner-developer of the channel; and as a result of receiving the indication of the stealth mode setting, configuring, by the server, the website and the mobile app to only be visible to the channel owner-developer and member end-users of the channel with permission to view the channel from the channel owner-developer in the stealth mode setting such that a search of the channel via a search engine hosted by the server does not display the channel unless the search is performed by the channel owner-developer or a member end-user of the channel with permission by the channel owner-developer to view the channel in the stealth mode setting.

In accordance with yet another feature, an embodiment of the present invention further includes, after the steps of creating the website and simultaneously creating the mobile app, receiving, by the, a selection, by the channel owner-developer, of a second selected template from the plurality of pre-determined web-app templates to replace the selected template and automatically including a pre-existing user content of the website and the mobile app in an updated instance of the website and the mobile app that is simultaneously updated based on the second selected template.

In accordance with another feature, an embodiment of the present invention provides a computer-implemented method of simultaneously creating a website and an app, the method including providing, at at least one server, a first coding template operably configured to create a website and a second coding template operably configured to create a mobile app; receiving, by the server, a selection of a selected template from a plurality of pre-determined website-app templates selectable by a channel owner-developer to create and open for editing an instance of a website-app user application editing interface; and creating, by the server, a channel including a website and a corresponding mobile app by executing the first code template to create the website and simultaneously executing the second coding template to create the corresponding mobile app with the selected template being an input to each of the first coding template and the second coding template.

In accordance with an additional feature of the present invention, the website and the mobile app are operably configured to be simultaneously editable via the website-app user application editing interface.

In accordance with yet another feature, an embodiment of the present invention includes a system for simultaneously creating a website and an app, the system having at least one server including at least one memory and at least one processor, the at least one memory storing a first coding template operably configured to create a website, a second coding template operably configured to create a mobile app, and a plurality of pre-determined website-app templates and the is processor operably configured to execute computer instructions for receiving a selection of a selected template from a plurality of pre-determined website-app templates selectable by a channel owner-developer to create and open for editing an instance of a website-app user application editing interface; and creating a channel including the website and the corresponding mobile app by executing the first code template to create the website and simultaneously executing the second coding template to create the corresponding mobile app with the selected template being an input to each of the first coding template and the second coding template.

In accordance with yet another feature of the present invention, the server is operably configured to simultaneously publish the website and the corresponding mobile app.

Although the invention is illustrated and described herein as embodied in a simultaneous website and mobile app creation system and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
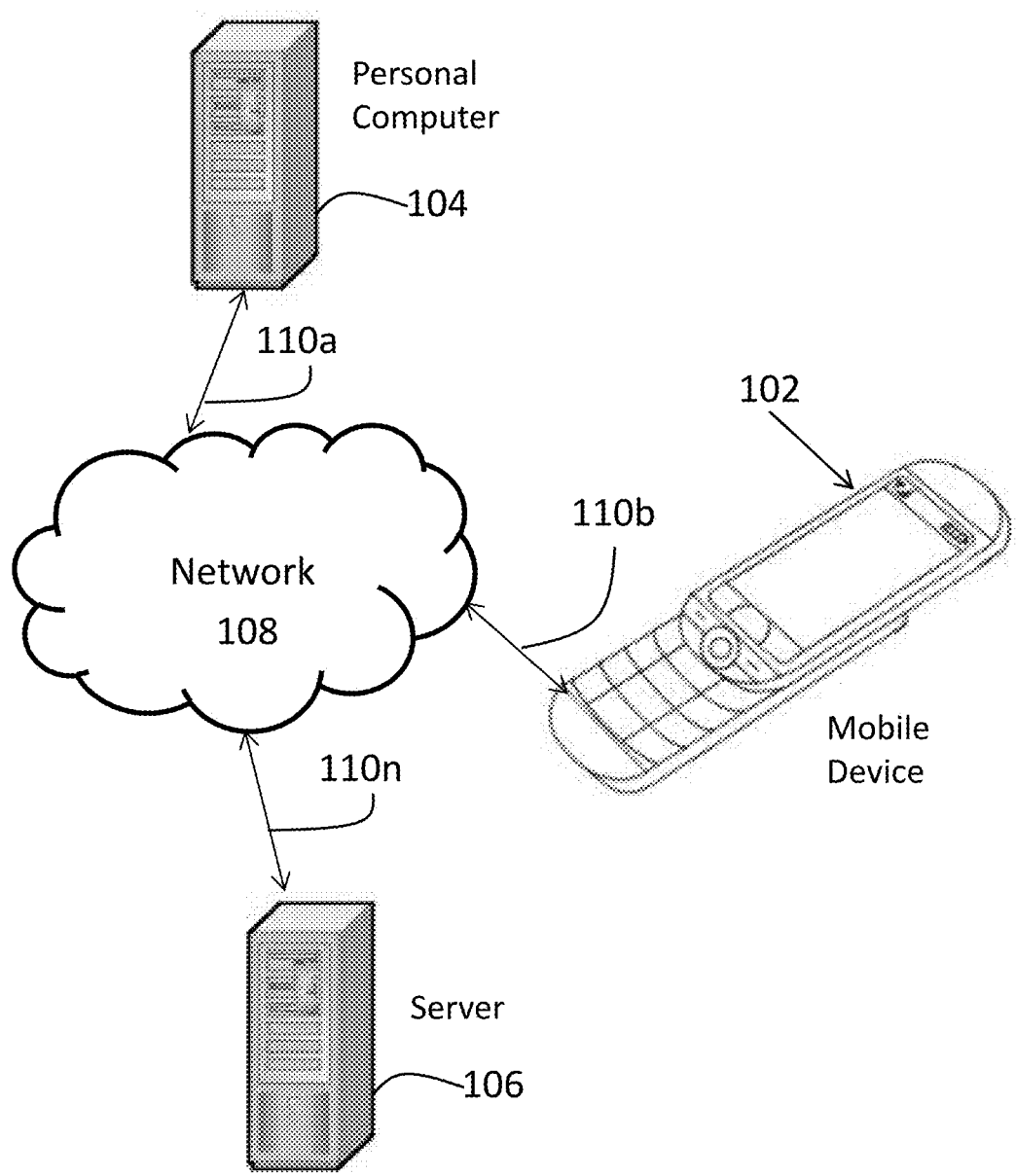
FIG. 1 is a block diagram view of an exemplary distributed data processing network with a mobile electronic device, a personal computer, and a server in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient system and method for simultaneously creating a website and a corresponding mobile app. Embodiments of the present invention provide for such simultaneous website and mobile app creation to be accomplished by a single developer interface such that editing inputs, via the developer interface, are simultaneously applied to both the website and the corresponding mobile app, without requiring separate, independent editing for the website and the mobile app. In addition, embodiments of the present invention include a first coding template operably configured to create a website and a second coding template operably configured to create a corresponding mobile app. Further embodiments of the present invention include creating a "channel" with the website and the corresponding mobile app by simultaneously executing the first and second coding templates, with a channel owner-selected website-app template as an input to each of the first and second coding templates.

Referring now to FIG. 1, one embodiment of the present invention is shown in a block diagram view. FIG. 1 shows several advantageous features of the present invention, but, as will be described below, the invention can be provided in several shapes, sizes, combinations of features and components, and varying numbers and functions of the components. The first example of a simultaneous website and mobile app creation system 100, as shown in FIG. 1, includes a mobile electronic device 102, a personal computing device 104, and at least one server 106, communicatively coupled over at least one network 108.

Network

The system 100 includes connections 110a-n, which are the medium used to provide communications links between various devices and computers connected together within the system 100. The connections 110a-n may be wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

In the depicted example, the network 108 can include the Internet, which represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network 108 also may be implemented as a number of different types of networks, such as for example, an Intranet, a local area network (LAN), or a wide area network (WAN). FIG. 1 is intended as an example, and not as an architectural limitation for the present invention. The system 100 and/or the network 108 may include additional servers and other devices and entities not shown.

In one embodiment, the system 100 permits channel owner-developers to conveniently and simultaneously create a website and a corresponding mobile app associated with a channel, via a single user-friendly editing application interface, as will be described herein below in more detail. Embodiments of the system 100 are configured such that a single input into the editing application interface may apply the associated edit to both the website and the mobile app simultaneously. Further, embodiments of the system 100 are configured to associate the channel with channel members and to automatically notify channel members responsive to changes to the channel, made by the channel owner, via the editing application interface. The website/app editing application interface provides channel owners with a multitude of novel and inventive features that allow business owners/entities with minimal time and minimal computer literacy to easily and simultaneously create and manage their website and corresponding mobile apps, which will be described herein below in more detail.

Hardware

Figure 2:
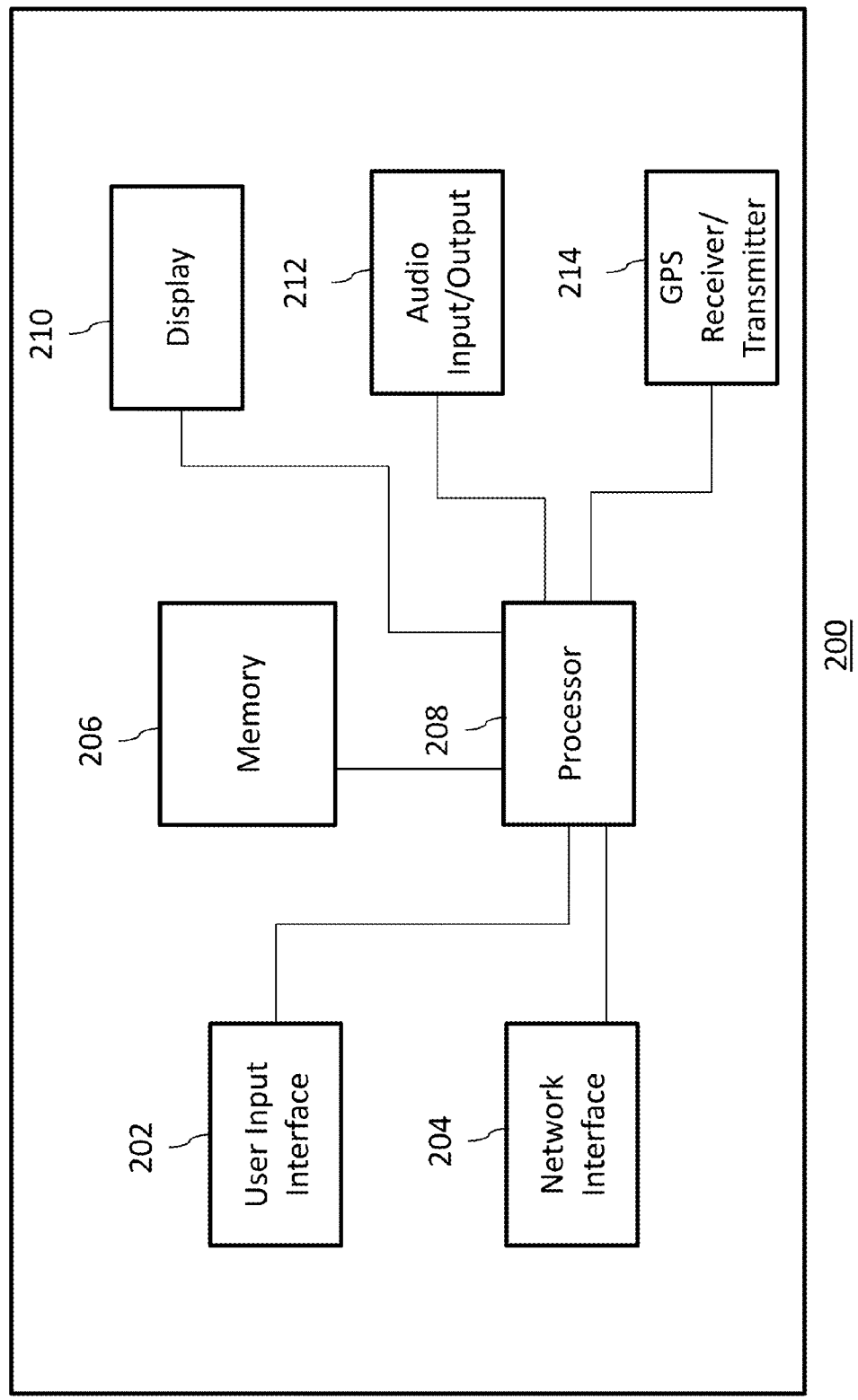
FIG. 2 is a block diagram view of an exemplary mobile electronic device in accordance with an embodiment of the present invention.

Referring now to FIG. 2, an exemplary electronic mobile device 200 is illustrated in a block diagram. The exemplary electronic mobile device 200 may be considered an example implementation of the mobile electronic device 102 depicted in the block diagram of FIG. 1. In another embodiment, the electronic mobile device 200 may be considered an example implementation of other devices and components within the system 100 depicted in FIG. 1.

The exemplary electronic mobile device 200 includes a user input interface 202, a network interface 204, memory 206, a processing device 208, a display 210, an audio input/output 212, and a location detection device 214.

The user input interface 202 functions to provide a user a method of providing input to the electronic mobile device 200. The user input interface 202 may also facilitate interaction between the user and the device 200. The user input interface 202 may be a keypad providing a variety of user input operations. For example, the keypad may include alphanumeric keys for allowing entry of alphanumeric information (e.g. telephone numbers, contact information, text, etc.). The user input interface 202 may include special function keys (e.g. a camera shutter button, volume control buttons, back buttons, home button, etc.), navigation and select keys, a pointing device, and the like. Keys, buttons, and/or keypads may be implemented as a touchscreen associated with the display 210. The touchscreen may also provide output or feedback to the user, such as haptic feedback or orientation adjustments of the keypad according to sensor signals received by motion detectors, such as an accelerometer, located within the device 200. The user input interface 202 may allow a channel owner to input edits and other commands for creating the channel and editing the channel, via the editing application interface. The user input interface 202 may allow the channel owner to input an acceptance input for requests to become members of the channel, in addition to other channel owner inputs associated with the inventive system and method.

The network interfaces 204 may include one or more network interface cards (NIC) or a network controller. In some embodiments, the network interface 204 may include a personal area network (PAN) interface. The PAN interface may provide the capability for the electronic mobile device 200 to network using a short-range communication protocol, for example, a Bluetooth communication protocol. The PAN interface may permit one electronic mobile device 200 to connect wirelessly to another electronic mobile device 200 via a peer-to-peer connection.

The network interfaces 204 may also include a local area network (LAN) interface. The LAN interface may be, for example, an interface to a wireless LAN, such as a Wi-Fi network. In one embodiment, there is a wireless LAN that provides the electronic mobile device 200 with access to the Internet for receiving and sending inputs/messages to the server 106, over the Internet. The range of the LAN interface may generally exceed the range available via the PAN interface. Typically, a connection between two electronic devices via the LAN interface may involve communication through a network router or other intermediary device.

Additionally, the network interfaces 204 may include the capability to connect to a wide area network (WAN) via a WAN interface. The WAN interface may permit a connection to a cellular mobile communications network. The WAN interface may include communications circuitry, such as an antenna coupled to a radio circuit having a transceiver for transmitting and receiving radio signals via the antenna. The radio circuit may be configured to operate in a mobile communications network, including but not limited to global systems for mobile communications (GSM), code division multiple access (CDMA), wideband CDMA (WCDMA), and the like.

Memory 206 associated with the device 200 may be, for example, one or more buffer, a flash memory, or non-volatile memory, such as random access memory (RAM). The electronic mobile device 200 may also include non-volatile storage. The non-volatile storage may represent any suitable storage medium, such as a hard disk drive or non-volatile memory, such as flash memory.

The processing device 208 can be, for example, a central processing unit (CPU), a microcontroller, or a microprocessing device, including a "general purpose" microprocessing device or a special purpose microprocessing device. The processing device 208 executes code stored in memory 206 in order to carry out operation/instructions of the electronic mobile device 200. The processing device 208 may provide the processing capability to execute an operating system, run various applications, such as the website/app editing application interface, and provide processing for one or more of the techniques and process steps described herein.

The display 210 displays information to the user such as an operating state, time, telephone numbers, various menus, application icons, pull-down menus, and the like. The display 210 may be used to present various images, text, graphics, or videos to the user, such as photographs, mobile television content, Internet webpages, and mobile application interfaces. The display 210 may be any type of suitable display, such as an liquid-crystal display (LCD), a plasma display, a light-emitting diode (LED) display, or the like. The display 210 may display the mobile app that was simultaneously created with its corresponding website, in accordance with embodiments of the present invention.

The electronic mobile device 200 may include audio input and output structures 212, such as a microphone for receiving audio signals from a user and/or a speaker for outputting audio data, such as audio alerts, songs, ringtones, video tracks, voice data received by the electronic mobile device 200 over a cellular network, and the like. The electronic mobile device 200 may also include an audio port for connection to peripheral audio input and output structures, such as a headset, or peripheral speakers or microphones.

The location detection device 214 may be associated with a global positioning system (GPS) or other location sensing technologies. The electronic mobile device 200 may have a GPS receiver or the like, to determine the location of the electronic mobile device 200. Such GPS location information of the electronic mobile device 200 may be useful for certain features of embodiments of the present invention, such as, for example, locating members of a channel.

Figure 3:
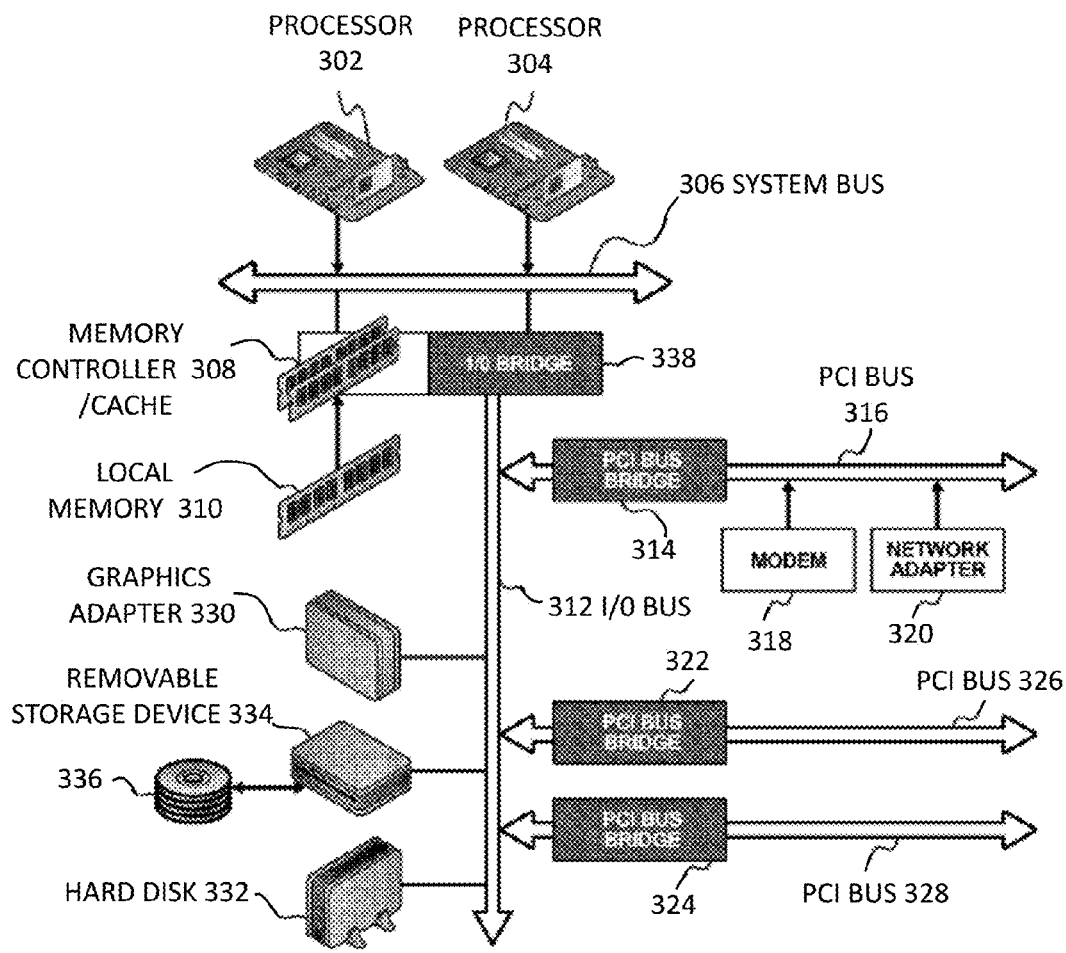
FIG. 3 is a block diagram view of a data processing system that may be implemented as a network device in accordance with an embodiment of the present invention.

Referring to FIG. 3, a block diagram of a data processing system 300 that may be implemented as a server, such as the personal computer 104 or server 106, or implemented as a mobile electronic device, recording device, or other computing device coupled to the network 108, as shown in FIG. 1, in accordance with one embodiment of the present invention.

The data processing system 300 may be a symmetric multiprocessor (SMP) system including a plurality of processors 302 and 304 connected to system bus 306. Alternatively, a single processor system may be employed. Also, connected to system bus 306 is memory controller/cache 308, which provides an interface to local memory 310. An I/O bus bridge 338 is connected to system bus 306 and provides an interface to I/O bus 312. The memory controller/cache 308 and I/O bus bridge 338 may be integrated as depicted. The processor 302 or 304 in conjunction with memory controller 308 controls what data is stored in memory 310. The processor 302 and/or 304 and memory controller 308 can serve as a data counter for counting the rate of data flow to the memory 310 or from the memory 310 and can also count the total volume of data accessed to or from the memory 310. The processor 302 or 304 can also work in conjunction with any other memory device or storage location.

Peripheral component interconnect (PCI) bus bridge 314 connected to I/O bus 312 provides an interface to PCI local bus 316. A number of modems 318, or wireless cards, may be connected to PCI bus 316. Typical PCI bus implementations will support four PCI expansion slots or add-in connectors. PCI includes, but is not necessarily limited to, PCI-X and PCI Express components. Communications links to the network of computers in FIGS. 1 and 2 may be provided through the modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, the data processing system 300 allows connections to a multiple network of computers. A graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The processes explained in detail below can be embodied in a computer program. Computer programs (also called computer control logic) are stored in memory such as main memory 310, removable storage drive 334, removable media 336, hard disk 332, and signals. Such computer programs, when executed, enable the computer system to perform the features of the present invention as discussed herein. In particular, the computer programs, when executed, cause the processor 302 and/or 304 to perform the features of the simultaneous website and mobile app creation system 100.

In this document, the terms "computer program medium," "computer usable medium," and "computer readable medium" are used to generally refer to media such as main memory 310, removable storage drive 334, removable media 336, hard disk 332, and signals. These computer program products are means for providing software to the computer system. The computer readable medium allows the computer system to read data, instructions, messages or message packets, and other computer readable information from the computer readable medium. The computer readable medium, for example, may include non-volatile (non-transitory) memory, such as Floppy, ROM, Flash memory, Disk drive memory, CD-ROM, and other permanent storage. It is useful, for example, for transporting information, such as data and computer/programming instructions, between computer systems. Furthermore, the computer readable medium may comprise computer readable information in a transitory state medium such as a network link and/or a network interface, including a wired or wireless network, that allows a computer to read such computer readable information.

Processes

Figure 5:
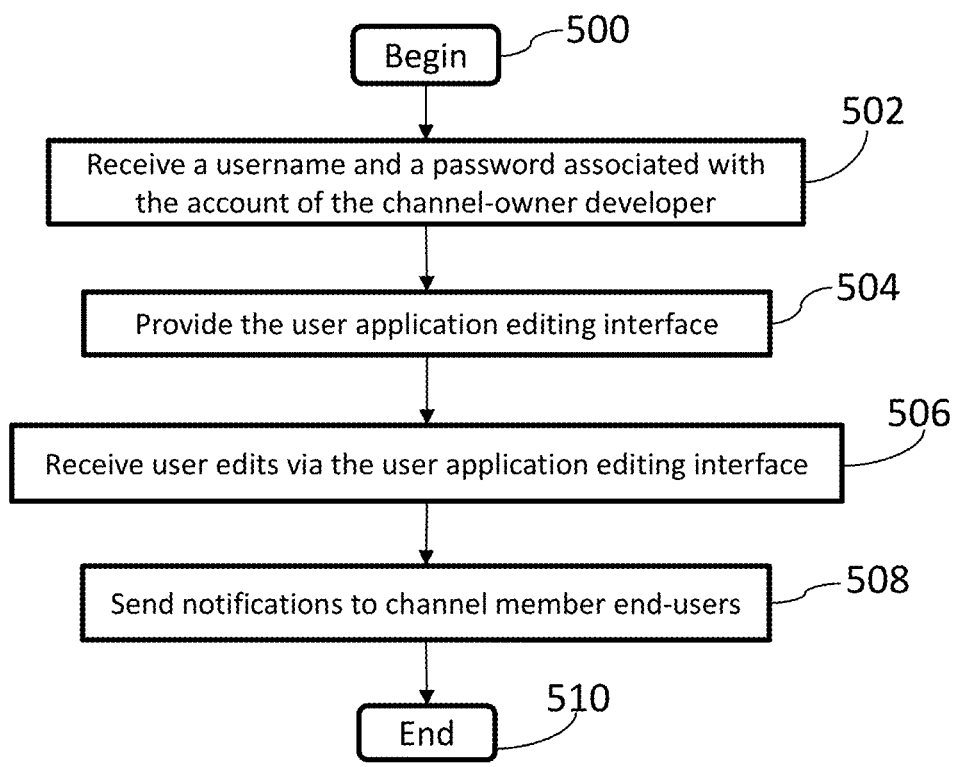
FIG. 5 is a process flow chart representing an exemplary method of modifying a channel in accordance with an embodiment of the present invention.
Figure 6:
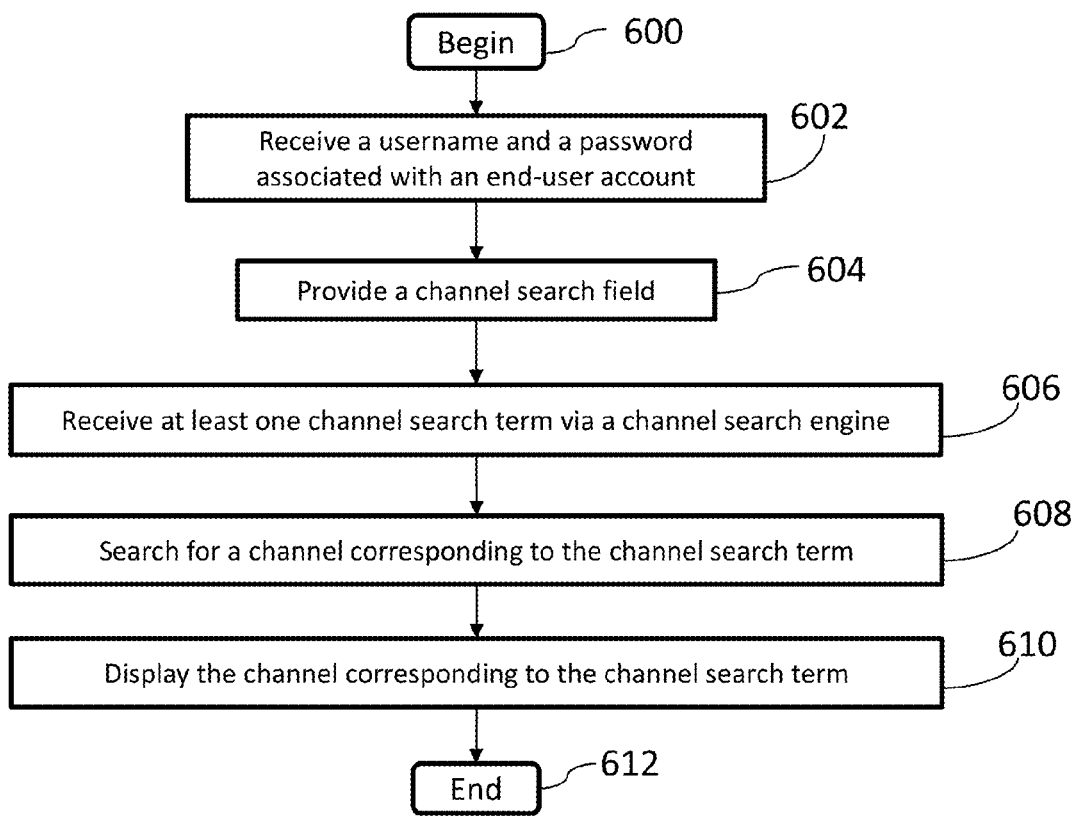
FIG. 6 is a process flow chart representing an exemplary method of searching for and joining a channel in accordance with the present invention.

Having described the network hardware components and system architecture for embodiments of the simultaneous website and mobile app creation system 100, the inventive processes that may be implemented on the system 100 in accordance with the present invention will now be described. In particular, FIGS. 1-3 and 7-29 will be described in conjunction with the process flow charts of FIGS. 4-6. Although FIGS. 4-6 show a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIGS. 4-6 for the sake of brevity. In some embodiments, some or all of the process steps included in FIGS. 4-6 can be combined into a single process step.

Creating a Channel

Figure 8:
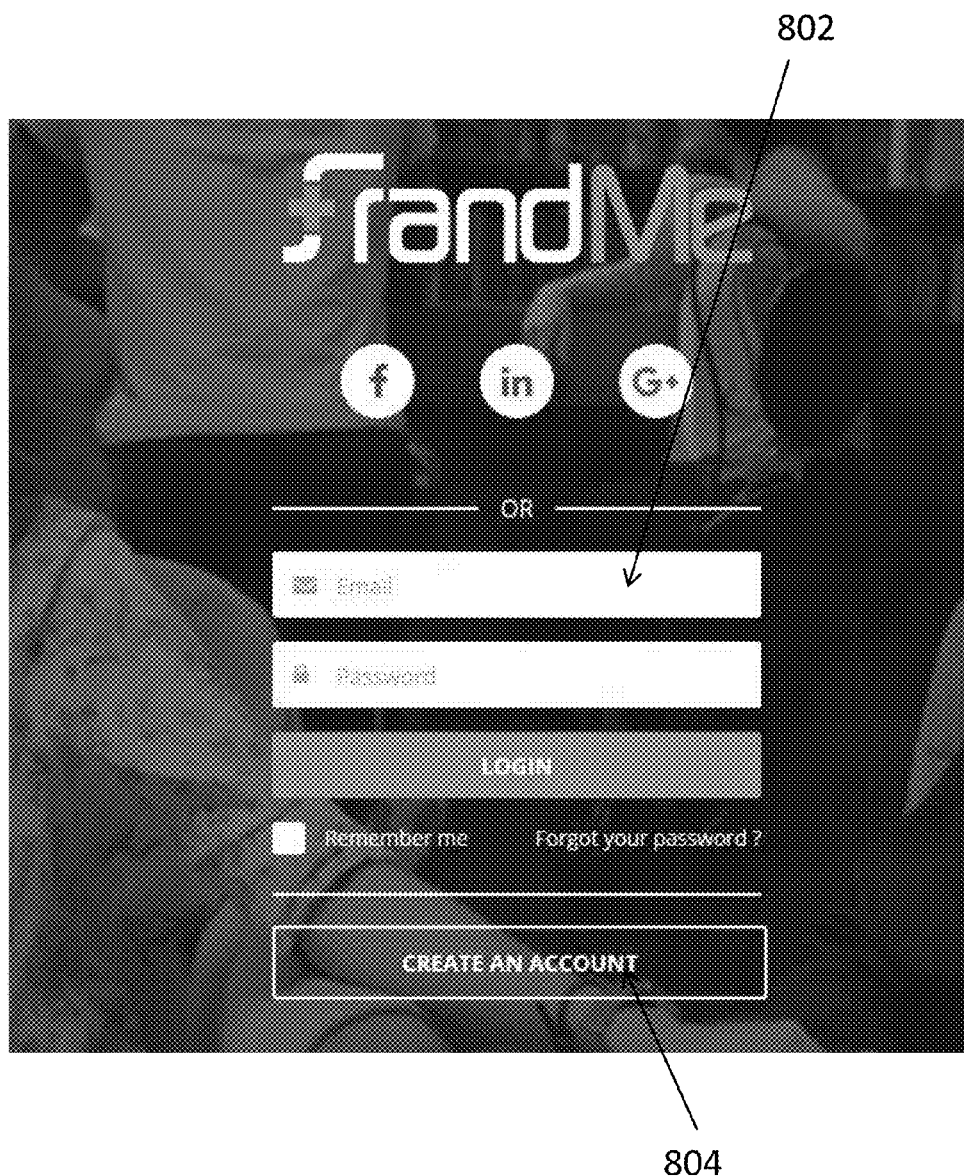
FIG. 8 is a screen shot of an exemplary software application at least partially implementing the inventive system and process, the screenshot depicting a login page on a user's electronic device in accordance with an embodiment of the present invention.

An exemplary process for creating one or more channels may begin at step 400 and may immediately proceed to step 402, where a username and a password associated with an account of a channel-owner developer may be received, by the server 106. In other words, the channel-owner developer may login to his/her user account, hosted by the server 106. As shown in FIG. 8, a log-in screen 800 may display user-input fields 802 for inputting the username and/or password information. Alternatively, if the channel-owner developer has not yet created an account, the channel-owner developer may first click on the "create an account" button 804 to create his/her account and interact with his/her account by, for example, providing various inputs such as profile information and other information to be associated with the account.

As used herein, the term "channel-owner developer" is intended to indicate a user that creates a channel by simultaneously creating a website and a corresponding mobile app in accordance with the present invention and whose channel is associated with and managed through such user's account. Further, the "channel-owner developer" is considered the website and app developer because his/her inputs into the editing application interface associated with his/her account is what creates/develops the website and the corresponding mobile app. The "channel-owner developer" can be contrasted with the term "member end-user" and "member," which is intended to indicate end-users, viewers, members of the channel that are associated with the channel, but are not provided with editing and other channel control privileges that are reserved for the channel-owner developer account. Because user accounts hosted by the server 106 allow users to create as well as join channels, member end-users of some channels may be channel-owner developers of their own channels.

Figure 9:
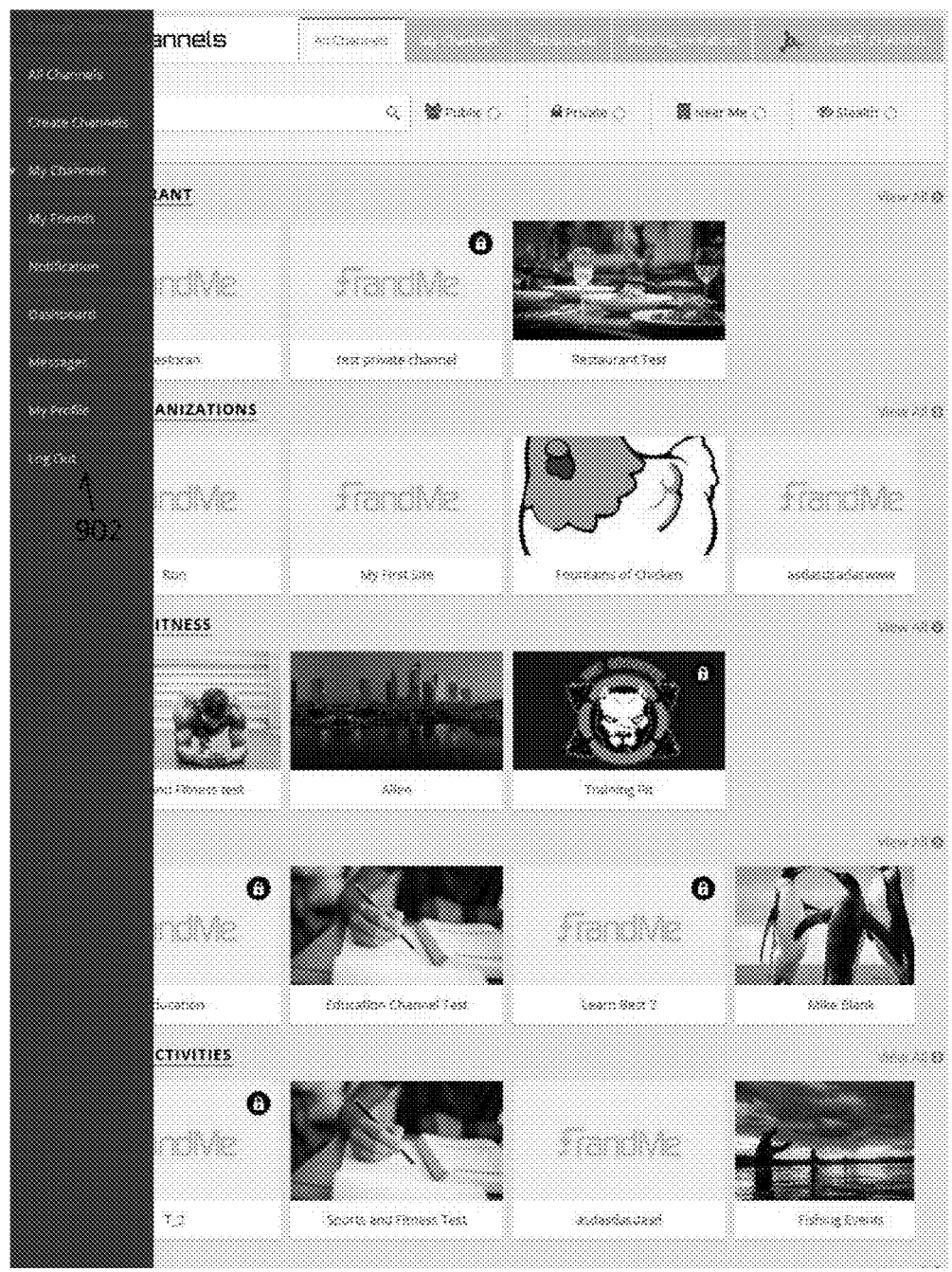
FIG. 9 is a screen shot of the exemplary software application of FIG. 8, depicting a home page of the exemplary software application in accordance with an embodiment of the present invention.

Once logged into his/her user account, the channel-owner developer may be directed to a main or home page in which the channel-owner developer may interact with the server 106. FIG. 9 is a screenshot of an exemplary home page 900. In one embodiment, the home page 900 may include a side bar 902 from which various options may be selected. In a further embodiment, the side bar 902 may include, for example, icons which, responsive to a user-selection of the icon, may allow the channel-owner developer to view all channels, create a new channel, show my channels, find friends, view channel notifications, select a current channel, view member chats, edit profile information, and the like.

Figure 10:
FIG. 10 is a screen shot of the exemplary software application of FIG. 8, depicting a user interface of the exemplary software application guiding a user in the creation of a channel in accordance with an embodiment of the present invention.

In step 404, the channel-owner developer may select an option to create a new channel. Stated another way, the server 106 may receive an indication to begin a channel creating process. A channel can be described as a modifiable HTML web page that is independently dedicated to a particular user's account. FIG. 10 is a screenshot of an exemplary channel creation guide page 1000. In one embodiment, the channel creation guide page 1000 may guide the channel-owner developer through a pre-determined linear process for simultaneously creating a website and corresponding mobile app. In other words, the channel creation guide page 1000 may, for example, provide a pre-determined sequential process that the channel-owner developer is required to follow in order to simultaneously create the website and the corresponding mobile app. Advantageously, such required sequential process greatly simplifies the website/app creation process that can be easily and quickly followed by the most computer-illiterate business owner. This is a major advantage over existing website development tools that are complex and time-consuming.

In one embodiment, the channel creation guide page 1000 provides a 5-step process for creating a channel. In a further embodiment, the 5-step process may require the user to perform the following steps to create the channel: 1) select a channel name; 2) choose a category for the channel; 3) choose a template for the channel; 4) choose a color scheme for the channel; and 5) click a "create channel" button. Accordingly, in step 406, the channel owner-developer may input a channel name into a user input field 1002 displayed in the channel creation guide page 1000. Such channel name input may be received by the server 106. The channel name can be any word, phrase, and/or alphamerical code that the channel owner-developer desires to be the channel name. Advantageously, users/prospective channel members may search for the channel by the channel name.

In step 408, the channel owner-developer may select a category to be associated with the channel. Accordingly, the server 106 may receive the user selection of the channel category and automatically associate the channel with the channel category during the channel creation process. In one embodiment, the channel creation guide page 1000 may display a list of channel categories from which the channel owner-developer may select. In the exemplary embodiment, the channel categories include restaurant, business organizations, health and fitness, education, sports and activities, and others. In other embodiments, there may be more or less categories, and/or different categories. A "category" can be considered a specifically defined class or group that a subject matter of the website and mobile app to be created generally falls under. A user desiring to view websites/mobile apps with information about such subject matter may select the appropriate category and, responsive to such selection, the server 106 may cause websites/mobile apps falling under the category to be displayed to the user.

Figure 7:
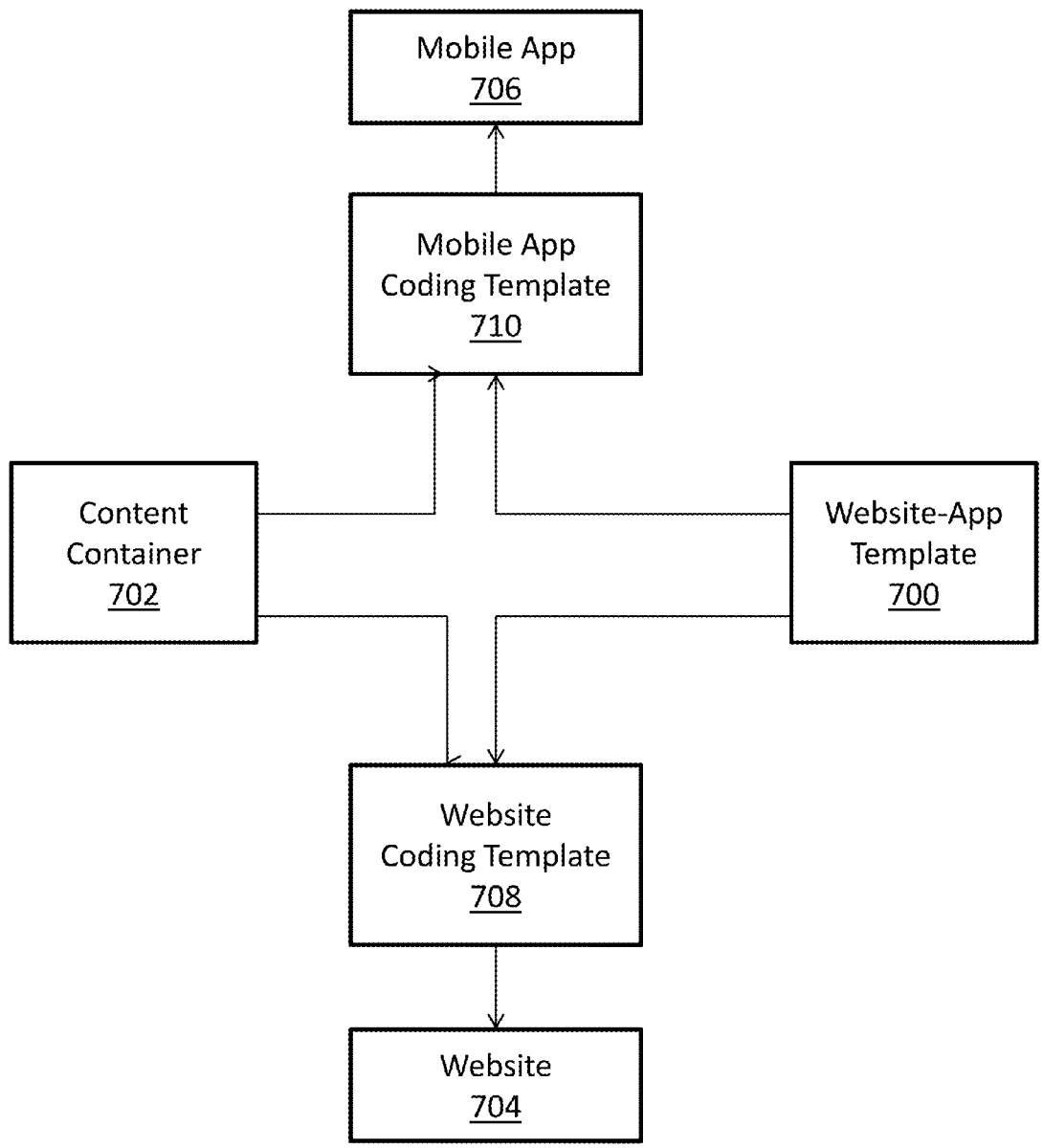
FIG. 7 is a block diagram view representing simultaneous creation of a website and a corresponding mobile app associated with a channel in accordance with an embodiment of the present invention.
Figure 11:
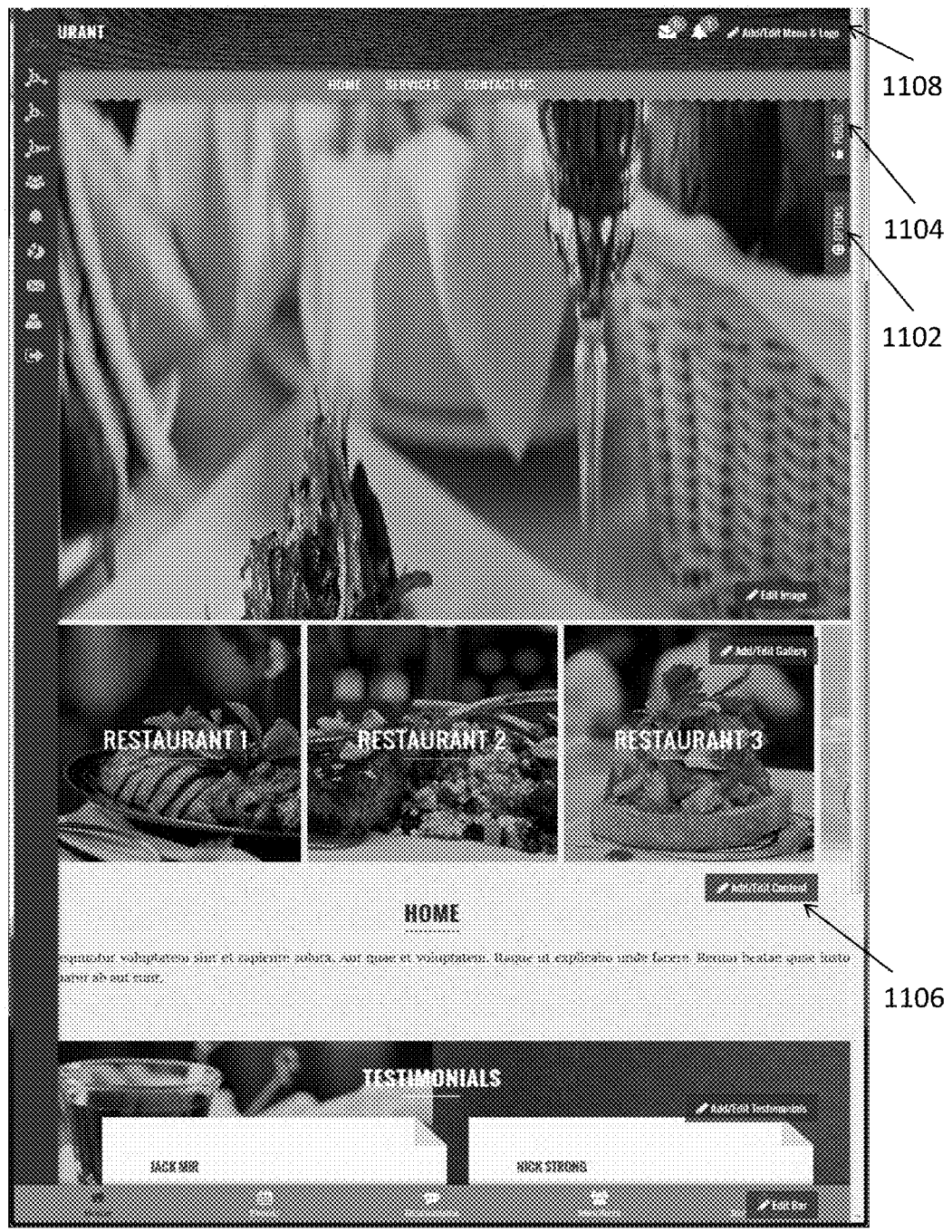
FIG. 11 is a screen shot of the exemplary software application of FIG. 8, depicting a website-app user application editing interface of the exemplary software application in accordance with an embodiment of the present invention.

Referring primarily to FIGS. 7, 10 and 11, in step 410, the channel owner-developer may select a selected template 700 from a plurality of pre-determined website-app templates 700 selectable by the channel-owner developer to create and open for editing an instance of a website/app user application editing interface 1100. Accordingly, the server 106 may receive the selection of the selected template 700 chosen by the channel owner-developer. In one embodiment, the plurality of website-app templates 700 may be stored at the server 106 and a graphical representation 1004 of each of the plurality of pre-determined website-app templates 700 selectable by the channel-owner developer may be displayed on the channel creation guide page 1000. It should be understood that although the singular term "server" is used herein for the sake of brevity, storage may occur at a database (or multiple databases) associated with the server and/or may be stored across more than one server. It should also be understood that even where the singular term "server" is used, processing steps may in some embodiments may be distributed across more than one server.

The pre-determined website-app templates 700 may be considered pre-built GUI templates with a pre-determined layout, menus, pages, web/app elements, and the like. The pre-determined website-app templates 700 may each be associated with one or more html files specifying the elements of the website and the mobile app, such as, for example, style elements (overall layout, font, colors, default graphics, background, header images, etc.). The computer program files associated with each pre-determined website-app template 700 may also include other like languages, specifying elements, features, and functionality of the website and the mobile app, including, but not limited to, CSS code, JavaScript, PHP, XML, Java, Swift, etc. Software languages used to create websites and mobile apps are known and will therefore not be discussed in detail herein. In one embodiment, the pre-determined website-app templates 700 may include one or more of the following elements/features: a home page, a blog page, a testimonials section, a contact us page, an events page, a products page, a services page, and the like. In additional embodiments, the pre-determined website-app templates 700 may include additional elements/features. The selected template 700 may be used to simultaneously create a website 704 and a corresponding mobile app 706.

The selected pre-determined website-app template 700 may also be associated with a content container 702, which may be populated with default content, but which may be edited, via the instance of the website/app user application editing interface 1100, to store channel owner-developer created content, such as, for example, text, graphics, photographs, images, video files, audio files, etc. The content container 702 may include files, folders, and/or sub-folders that can store default content and/or channel owner-developer created content that will be used to simultaneously create and/or update the website 704 and the corresponding mobile app 706. Such content may include text that the channel owner-developer inputs via the website/app user application editing interface 1100 (e.g., testimonials, headers, and other textual information); photographs, graphics or other images that the channel-owner developer uploads via the website/app user application editing interface 1100; audio files and/or video files that the channel-owner developer uploads via the website/app user application editing interface 1100; and/or any other user-type content that is typically provided on websites and mobile apps.

In step 412, the channel owner-developer may select a selected color scheme selection from a plurality of color-schemes 1006 selectable by the channel-owner developer for the instance of the website/app user application editing interface 1100. The selected color scheme 1006 may be used to determine the overall color scheme of the website 704 and the corresponding mobile app 706. Advantageously, a single user input selecting the selected color scheme 1006 can result in the color scheme of the both the website 704 and the mobile app 706 being simultaneously chosen by the channel-owner developer. In some embodiments, the color schemes 1006 may be considered color scheme templates. The colors offered to the channel-owner developer may be any colors, such as, for example, green, orange, red, white, black, blue, purpose, various color-blends, and the like.

In step 414, the channel owner-developer may select a create channel button 1008 to complete the 5-step process provided on the channel creation guide page 1000. In other embodiments, the button 1008 may be provided as another selection-type web element typically provided on user interfaces, such as, for example, an icon, a check box, a link, and the like, which are generally well-known. In other embodiments, the channel creation guide page 1000 may provide a process for creating a channel that is less than 5-steps or greater than 5-steps. The server 106 may receive the indication to create the channel.

In one embodiment, there may be provided to the channel owner-developer an option to de-select simultaneous website and mobile app creation, such as, for example, by a settings option, a check box, a drop down list, or other selection-type web element. In such embodiment, the channel owner-developer may indicate creation of only a website and/or only a mobile app. Although this is a non-preferred embodiment, certain embodiments may provide this option to the channel owner-developer.

In step 416, as a result of receiving the indication to create the channel, the website 704 and the corresponding mobile app 706 may be simultaneously created. More specifically, in one embodiment, there may be provided a first coding template 708 and a second coding template 710. The first coding template 708 may be considered software code or at least a portion of software code that is operably configured to create the website 704 when executed by a processor, such as, the processors 302 or 304. The second coding template 710 may be considered software code or at least a portion of software code that is operably configured to create the mobile app 706 when executed by a processor, such as, the processors 302 or 304. In one embodiment, the website 704 and the corresponding mobile app 706 may be simultaneously created by executing the first coding template 708 and the second coding template 710. In another embodiment, the first and second coding templates 708 and 710 are simultaneously executed so as to simultaneously create the website 704 and the corresponding mobile app 706. The channel owner-developer inputs from the 5-step process described herein above may be the inputs to the first and second coding templates 708 and 710 so as to simultaneously create the website 704 and the mobile app 706 to entirely or at least substantially resemble each other. In one embodiment, the channel may be created to include the website 704 and the corresponding mobile app 706 by executing the first coding template 708 to create the website 704 and simultaneously executing the second coding template 710 to create the corresponding mobile app 706, with at least the selected website-app template 700 as an input to each of the coding templates 708, 710, as illustrated in FIG. 7. In a further embodiment, the inputs to the coding templates 708, 710 may also include the contents of the content container 702. In yet further embodiments, the inputs to the coding templates 708, 710 may also include the selected color scheme 1006, the channel name, the selected channel category, and any other appropriate inputs provided by the channel owner-developer. In one embodiment, the inputs to the coding templates 708, 710 may be provided by one or more function calls within the coding templates 708, 710 to access and/or retrieve content for the website 704 and corresponding mobile app 708 from one or more directory folders that may be stored at the server 106.

Advantageously, the website 704 and the mobile app 706 may be simultaneously editable via a single editing interface, namely, the website-app user application editing interface 1100. This is in direct contrast to existing editing platforms, which are either for editing websites, using HTML and other languages/scripts associated with website development, OR for editing mobile apps, using languages associated with creating/developing mobile apps that may be supported by a particular OS (e.g., Android, iOS). Embodiments of the present invention represent a significant improvement over such existing editing platforms, because a single user interface can be used to simultaneously edit both a website and a corresponding mobile app. Despite the prevailing need for an editing platform that is effective and efficient, as described above, those known platforms have failed to sufficiently address that need, even in the face of constant and rapid growth and development in this technology field.

In one embodiment, simultaneous creation of the website 704 and the corresponding mobile app 706 may further include a step of automatically hosting, by the server 106, the website 704 and the mobile app 706 on, for example, a common domain associated with the server 106 (e.g., Frandme.com). In one embodiment, the website 704 address may include such common domain name in addition to the channel name (e.g., Frandme.com/channelname). The server 106 may associate the channel name with the channel such that the channel name (e.g., My Restaurant Name) may be searchable via a search engine, which will be discussed herein in more detail with reference to the flow charted depicted in FIG. 6. The simultaneously created website 704 and the mobile app 706 may be associated, by the server 106, with the channel owner-developer user account that was accessed by the username and the password, in step 402 of the exemplary process. Accordingly, the channel owner-developer may periodically login to his/her account to edit the channel and/or check various channel settings, status indicators, messages, notifications, etc. associated with the channel, through the channel owner-developer's user account.

Figure 12:
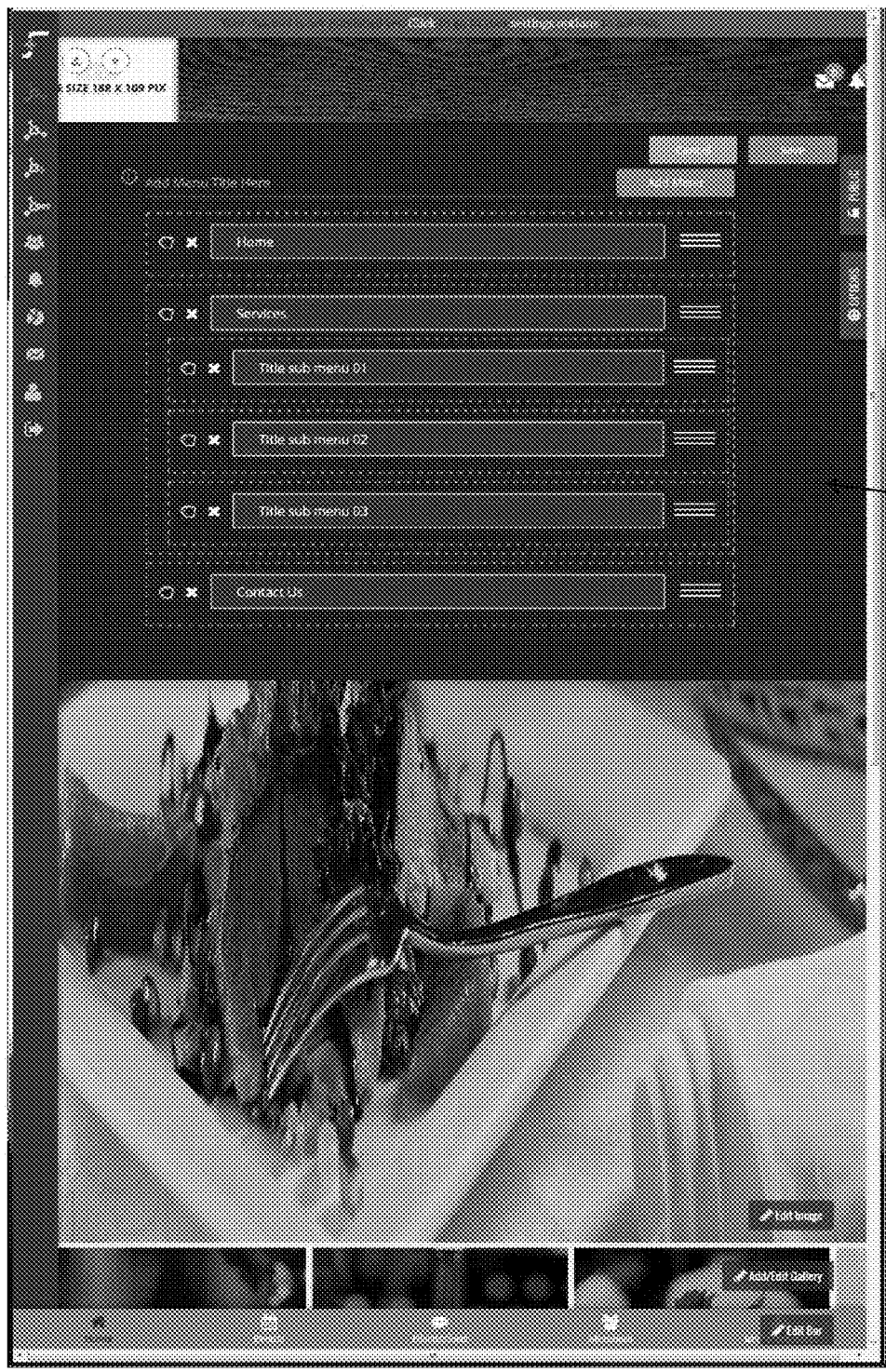
FIG. 12 is a screen shot of the exemplary software application of FIG. 8, depicting a user editing a menu via the website-app user application editing interface of the exemplary software application in accordance with an embodiment of the present invention.
Figure 13:
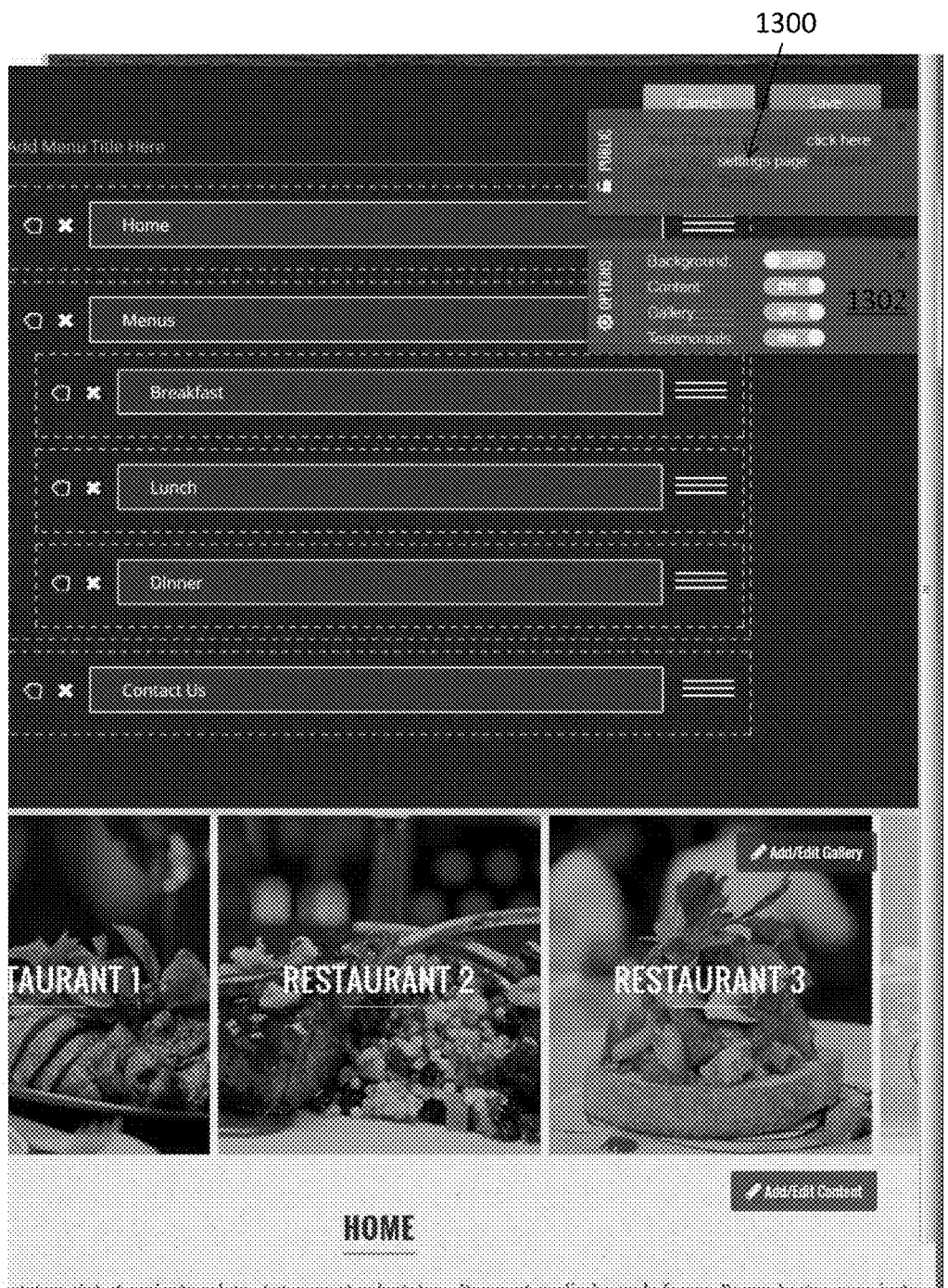
FIG. 13 is a screen shot of the exemplary software application of FIG. 8, depicting a user viewing a settings and options tab via the website-app user application editing interface of the exemplary software application in accordance with an embodiment of the present invention.

In a further embodiment, simultaneous creation of the website 704 and the corresponding mobile app 706 may further include a step of automatically creating a social component associated with the website 704 and the mobile app 706. The social component may be in the form of a discussion feature, where the channel owner-developer and/or end-user members may create and/or participate in a discussion for members only. FIGS. 11 and 12, at a bottom portion of the page, illustrate an icon indicating where members may select in order to join, participate in, and/or create a group discussion. In yet a further embodiment, the channel owner-developer and/or end-user members may be automatically notified as a result of a new discussion post. Advantageously, embodiments of the present invention allow channel owner-developers to simultaneously create the website 704 and the mobile app 706 with such discussion feature built-in to the website 704 and mobile app 706. Existing platforms require such chat/group messaging/discussion features to be separately added into the website or the mobile app by a software developer with such specialized knowledge and skills, as this is typically considered an advanced feature. Such embodiments of the present invention eliminate this requirement and allow for the automatic creation/inclusion of such features into the website 704 and the corresponding mobile app 706 during their simultaneous creation.

One example of at least a portion of the software code that may be executed to simultaneously create the website 704 and the corresponding mobile app 706 in accordance with embodiments of the present invention is listed in the Computer Program Listing Appendix.

Of course, in other embodiments, the software code to implement simultaneous creation of the website 704 and the mobile app 706 may be different and/or may be written in a different language. Portions of this document, including the software code disclosed herein below is subject to copyright protection and all copyright rights, privileges, and protections are reserved by the copyright owner.

In one embodiment, in step 418, the instance of the website/app user application editing interface 1100 may be created and opened for editing by the channel owner-developer, as illustrated in FIG. 11. The website/app user application editing interface 1100 may be automatically opened and displayed for the channel owner-developer and may be automatically populated by default content from the content container 702.

In step 420, the channel owner-developer may input user edits via the user application editing interface 1100. In one embodiment, the user application editing interface 1100 may represent the website 704 and corresponding mobile app 706 as it would generally appear as published. In such embodiment, the user application editing interface 1100 may further include editing selection options, such as an options tabs 1102, a settings tab 1104, add/edit content selection buttons 1106, etc., which would not be shown on the published website 704 and mobile app 706. Stated another way, in one embodiment, the user application editing interface 1100 may be operably configured to display a plurality of editing features 1102, 1104, 1106. Such editing feature may allow the channel owner-developer to edit the channel via user inputs into at least one of the plurality of editing features 1102, 1104, 1106 that may be displayed on the user application editing interface 1100. The user application editing interface 1100 and any other associating channel editing tools may not be accessible by users other than the channel owner-developer. In other words, the channel is non-editable by channel member end-users, which can be contrasted with social networks in which user-created content published on a user's social network account is substantially provided by posts of social network friends.

With reference to the screenshots depicted in FIGS. 11-22 and 29, an exemplary process for the channel owner-developer providing various edit inputs to edit the channel is presented. In one embodiment, the channel owner-developer may select an add/edit menu button 1108. Responsive to such selection, the user application editing interface 1100 may display a menu editing feature 1200 that allows the user to add, edit, and/or delete menus and sub-menus, as illustrated in FIG. 12. The menu editing feature 1200 may be provided in various different known forms, such as, for example, a pop-up window. When the channel owner-developer desires, the edits made to the channel via the menu editing feature 1200 may be saved, or, alternatively, cancelled by selecting the appropriate save or cancel button.

For the sake of brevity, commonly known terms such as, for example, button, icon, tab, menu, field, page, and the like, will be used herein to describe the exemplary channel editing process; however, it should be understood that various known web elements and other selection/input features may be used to implement the editing process in other embodiments.

Figure 14:
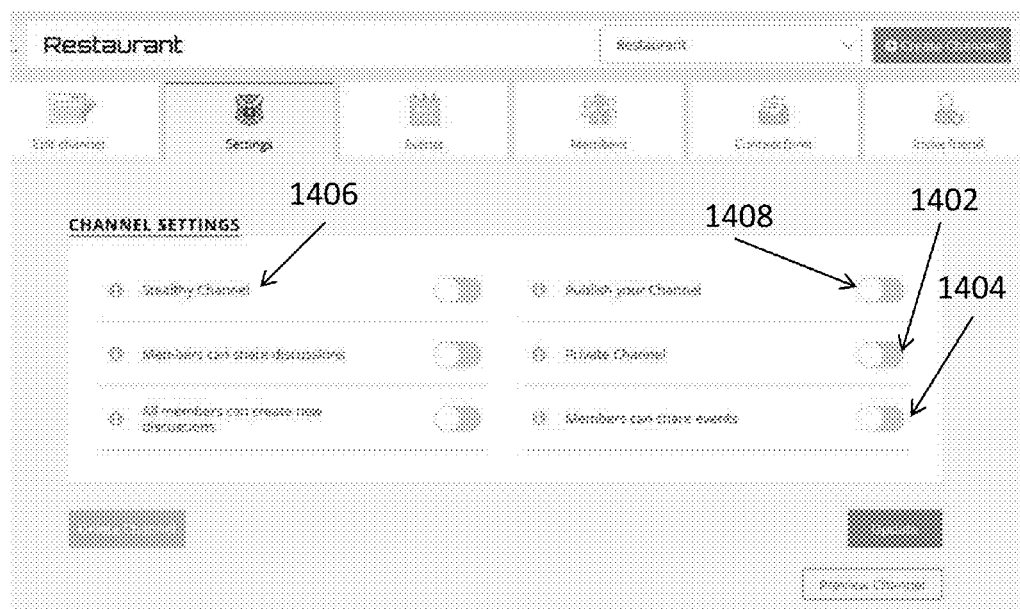
FIG. 14 is a screen shot of the exemplary software application of FIG. 8, depicting a setting page of the exemplary software application in accordance with an embodiment of the present invention.
Figure 15:
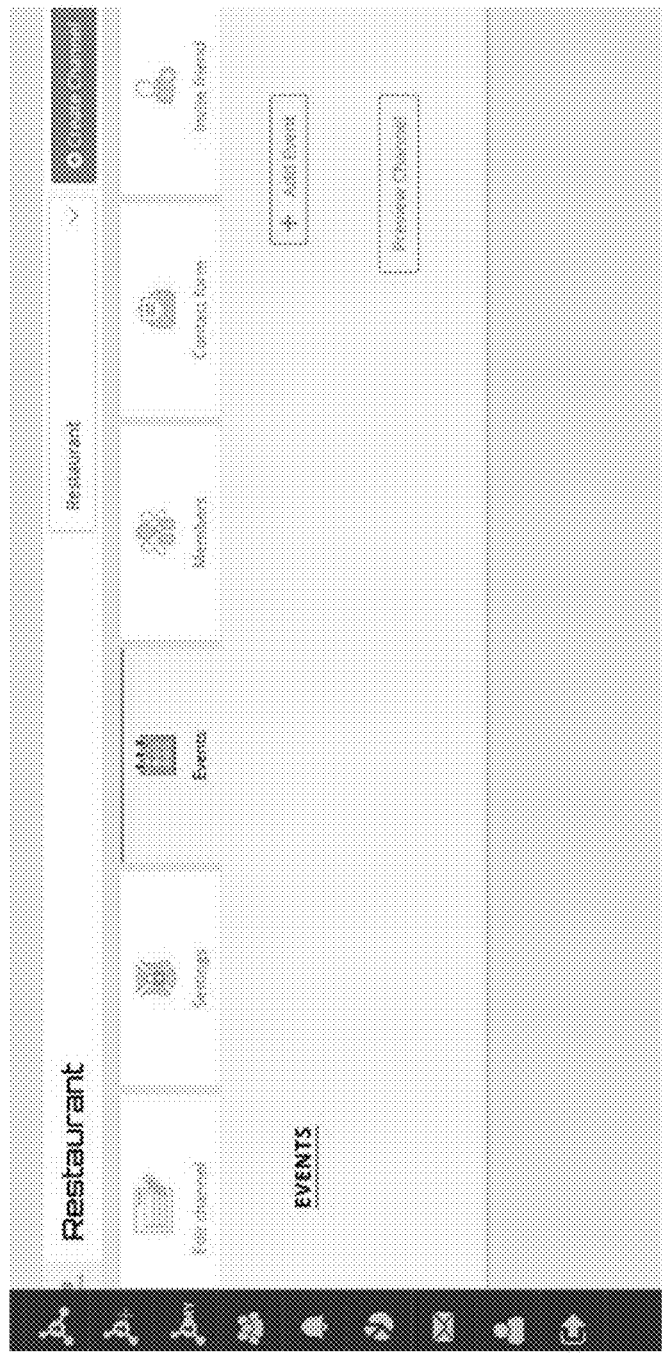
FIG. 15 is a screen shot of the exemplary software application of FIG. 8, depicting an events page of the exemplary software application in accordance with an embodiment of the present invention.
Figure 16:
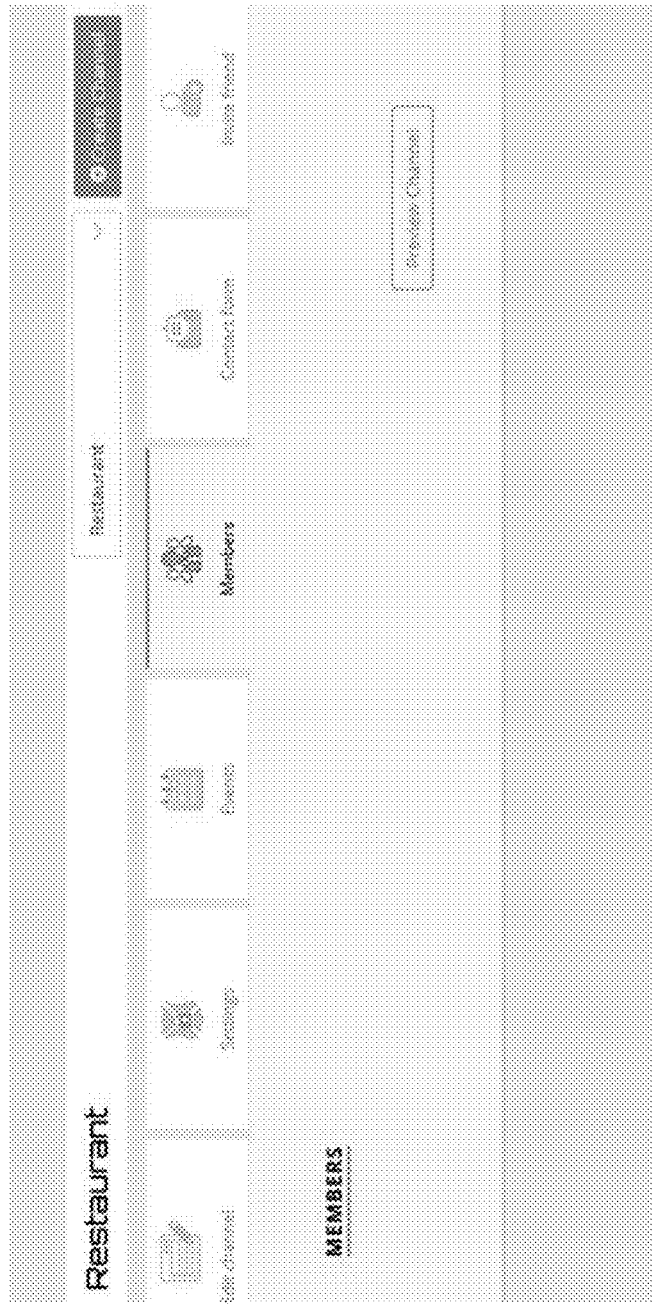
FIG. 16 is a screen shot of the exemplary software application of FIG. 8, depicting a members page of the exemplary software application in accordance with an embodiment of the present invention.
Figure 17:
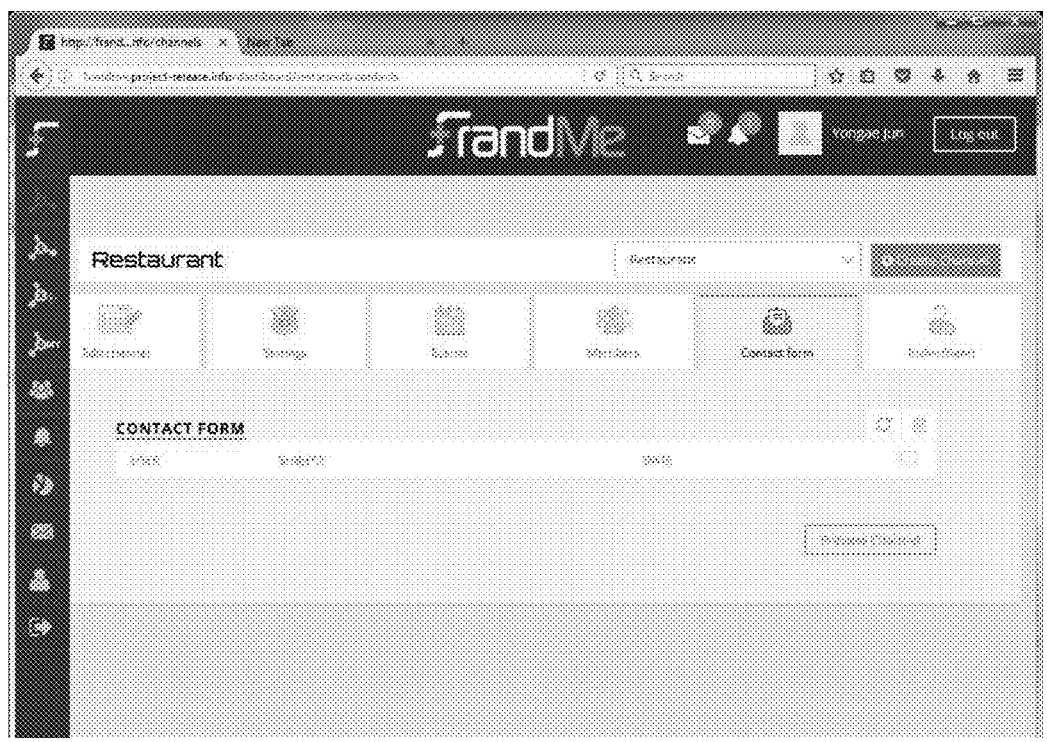
FIG. 17 is a screen shot of the exemplary software application of FIG. 8, depicting a contacts page of the exemplary software application in accordance with an embodiment of the present invention.
Figure 18:
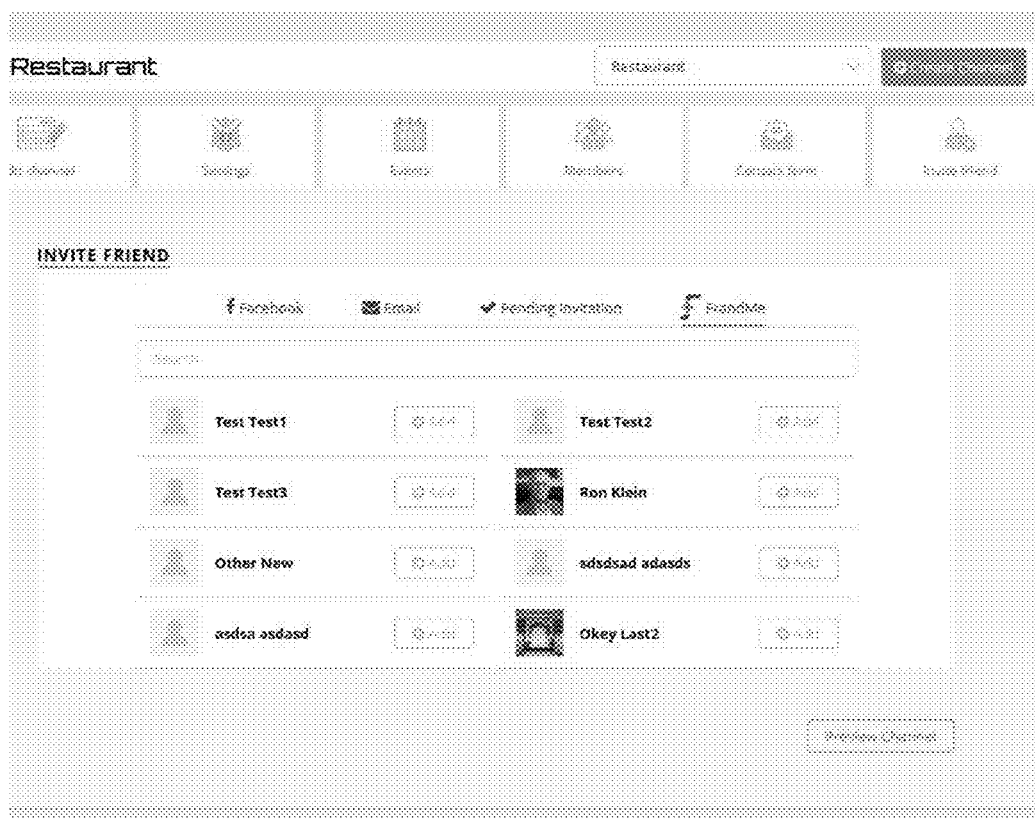
FIG. 18 is a screen shot of the exemplary software application of FIG. 8, depicting an invitations page of the exemplary software application in accordance with an embodiment of the present invention.
Figure 19:
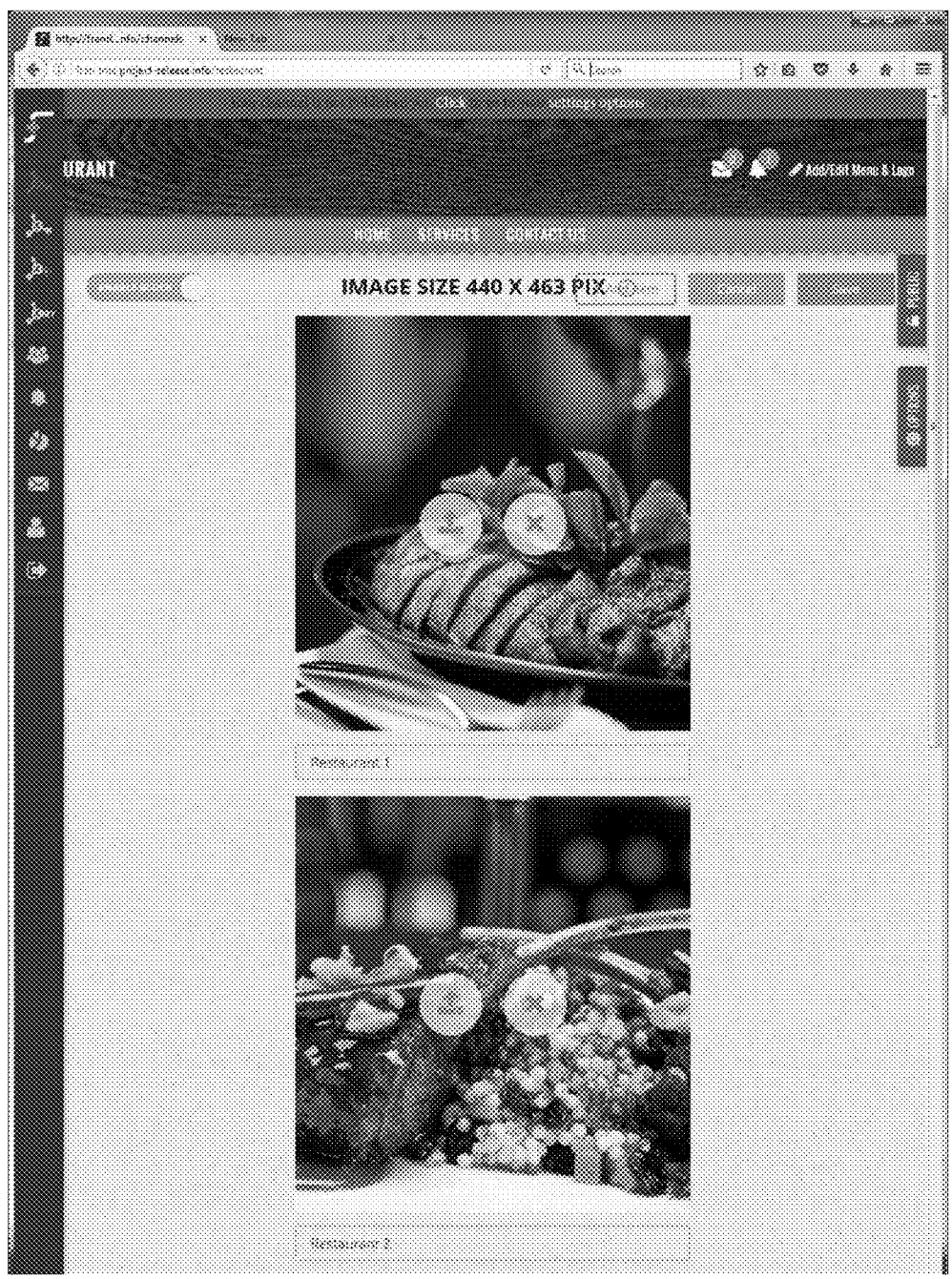
FIG. 19 is a screen shot of the exemplary software application of FIG. 8, depicting a user editing images via the website-app user application editing interface of the exemplary software application in accordance with an embodiment of the present invention.
Figure 20:
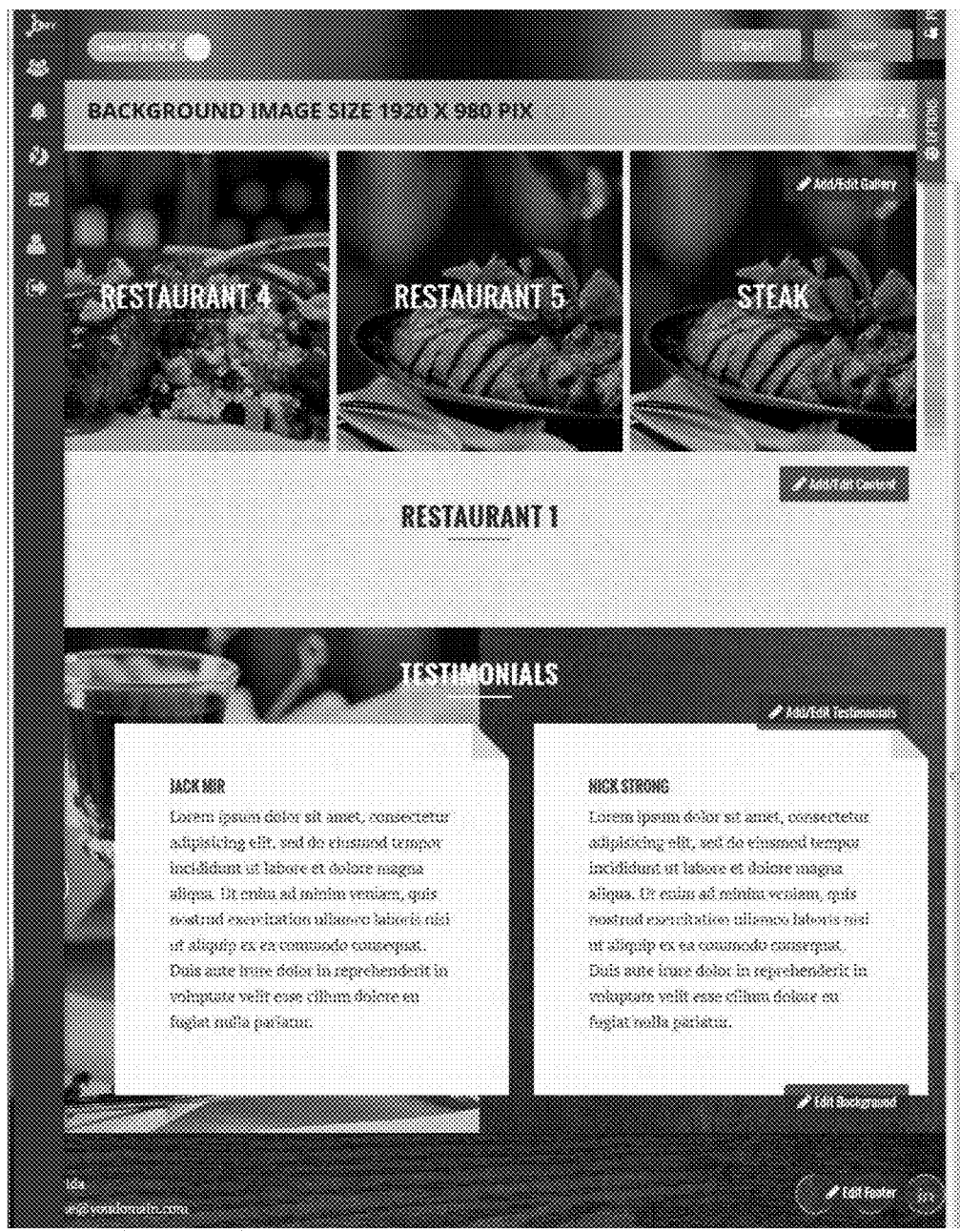
FIGS. 20-22 are screen shots of the exemplary software application of FIG. 8, depicting a user editing via the website-app user application editing interface of the exemplary software application in accordance with an embodiment of the present invention.
Figure 21:
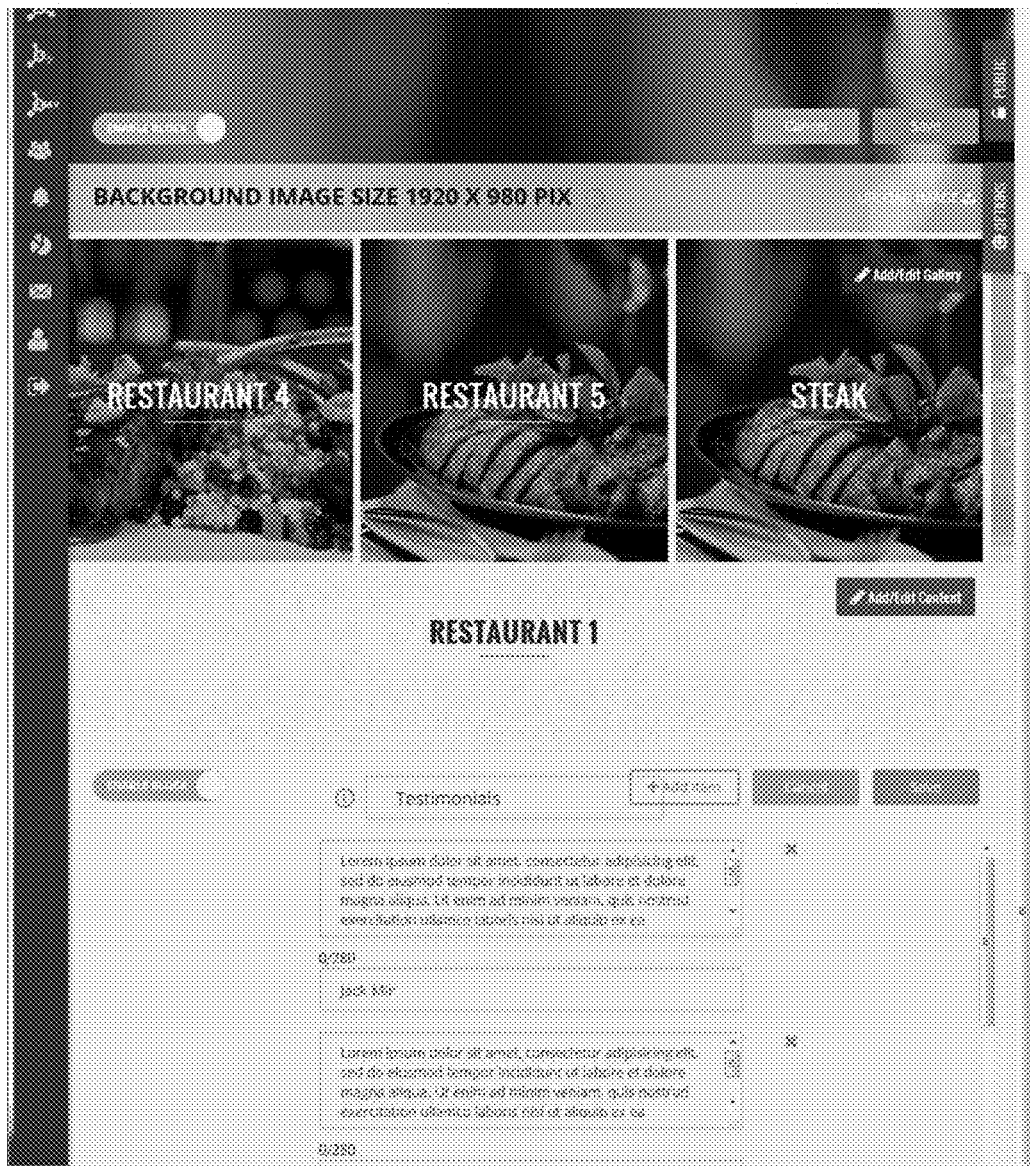
Figure 22:
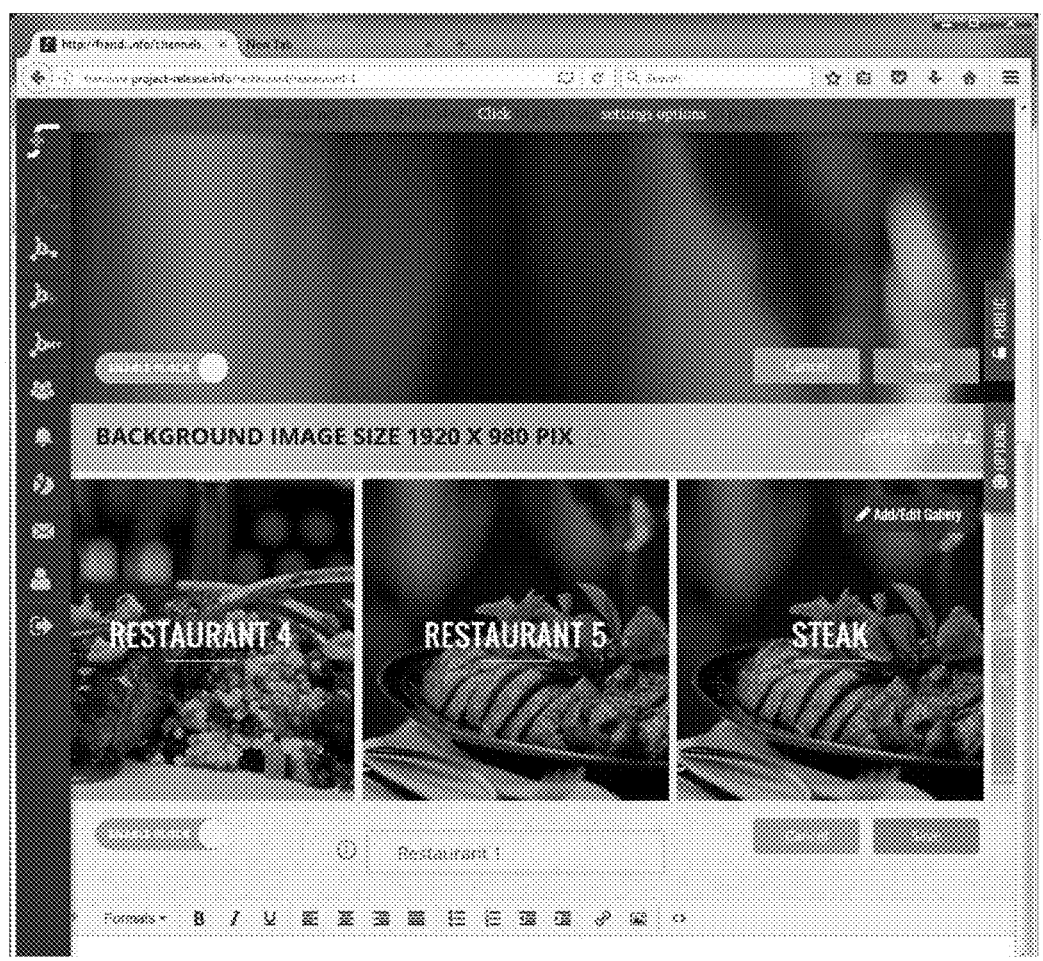

The channel owner-developer may select the settings tab 1104. As a result, a channel settings link 1300 may be displayed, which, when clicked-on by the channel owner-developer, transitions the channel owner-developer to a settings page 1400, as illustrated in FIG. 14. The settings page 1400 may allow the channel owner-developer to select from a plurality of channel settings. In one embodiment, there may be provided three primary privacy channel settings, which may include a public channel setting (not shown), a private channel setting 1402, and a stealthy channel setting 1406. In a further embodiment, the public channel setting may be a default setting. A public channel may be configured to be freely accessible by an end-user with an end-user account associated with the server 106. In another embodiment, the public channel may be configured to be freely accessible by any user with access to the Internet and a browser. In one embodiment, the private channel setting 1402 may be formed as, for example, a toggle button to allow the channel owner-developer to select and de-select the channel as a private channel. The private channel setting 1402, when selected, may configure the channel such that the channel owner-developer is required to approve an end-user as a member of the channel. In one embodiment, a private channel may permit end-users to view the website 704 and the corresponding app 706 generally, but may limit certain features to only channel members, such as, for example, member chats, channel change notifications, messaging features, etc. In one embodiment, the settings page 1400 may also include toggle buttons 1404 to allow the channel owner-developer to select what features are available to members, such as, for example, event sharing, new discussion creation, discussion sharing, etc.

In another embodiment, a third novel channel settings option that may be provided on the channel settings page 1400 may be a stealthy channel setting 1406. By selecting the toggle button to turn on the stealth mode setting, the channel may be configured such that the website 704 and the corresponding mobile app 706 may only be visible to the channel owner-developer and member end-users of the channel with specific permission from the channel owner-developer to view the channel in the stealth mode setting. In other words, a search of the channel, via a search engine hosted by the server 106, would not display the channel, unless the search is performed by the channel owner-developer or a channel member end-user of the channel with the permission from the channel owner-developer to view the channel in the stealth mode setting. Stated yet another way, if stealth mode is on, no one can view the website or mobile app unless the end-user knows the exact name of the channel, requests permission from the channel owner-developer to join the channel and to be able to view the channel in stealth mode.

One example of at least a portion of the software code implementing stealth mode in accordance with embodiments of the present invention is listed in the Computer Program Listing Appendix.

Of course, in other embodiments, the software code to implement stealth mode may be different and/or may be written in a different language.

Referring again primarily to FIGS. 11 and 13, the channel owner-developer may select the options tab 1102. As a result, an options menu 1302 may be displayed. In one embodiment, the options menu 1302 may include toggle buttons for all or at least a portion of the elements of the website 704 and the mobile app 706. Such toggle buttons may allow the channel owner-developer to selectively turn on and off such elements of the website 704 and the mobile app 706. If an element is turned off, the website 704 and the mobile app 706 may no longer display such element. In one embodiment, the options menu 1302 may include toggle buttons for the background, content, a gallery, and a testimonials section.

Referring now primarily to FIGS. 15-18, various pages or menus may be accessible by the channel owner-developer to perform various functions associated with the channel. In one embodiment, there may be provided an events page 1500 that may allow the channel owner-developer to add events to the channel. In another embodiment, there may be provided a members page 1600 that may allow the channel owner-developer to view all members of the channel. When a channel is initially created, there may not be any members associated with the channel. However, as requests and invites are sent to join the channel, members can be listed in the members page 1600. In one embodiment, each member may be managed through the members page 1600. For example, a remove, black list, and message button may be associated with each member listed, where the channel owner-developer may select to remove the member, black list the member, or message the member, respectively. The members page 1600 may provide other features associated with managing members to a channel.

In one embodiment, there may be provided a contact form page 1700 that may be used by the channel owner-developer to perform various contacting functions, such as, for example, contacting end-users. In another embodiment, there may be provided an invite friends page 1800 that may be used by the channel owner-developer to invite friends or end-users to join the channel. The invite friends page 1800 may also list the status of pending invitations. In yet another embodiment, the invite friends page 1800 may display member requests. In yet another embodiment, the invite friends page 1800 may include links to invite prospective members to the channel via a third-party social network link. The invite friends page 1800 may also include other features associated with inviting, accepting, reviewing, and receiving requests to join the channel.

Referring to FIGS. 19-22, in one embodiment, the user application editing interface 1100 may be configured to allow the channel owner-developer to upload and delete photographs associated with the website 704 and the mobile app 706 (the channel) and to also add, edit, or delete text associated with the same. In a further embodiment, there may be provided an enable/disable toggle button associated with each page and/or block on a page that allows the channel owner-developer to selectively enable or disable a page, or elements/blocks of a page.

Figure 23:
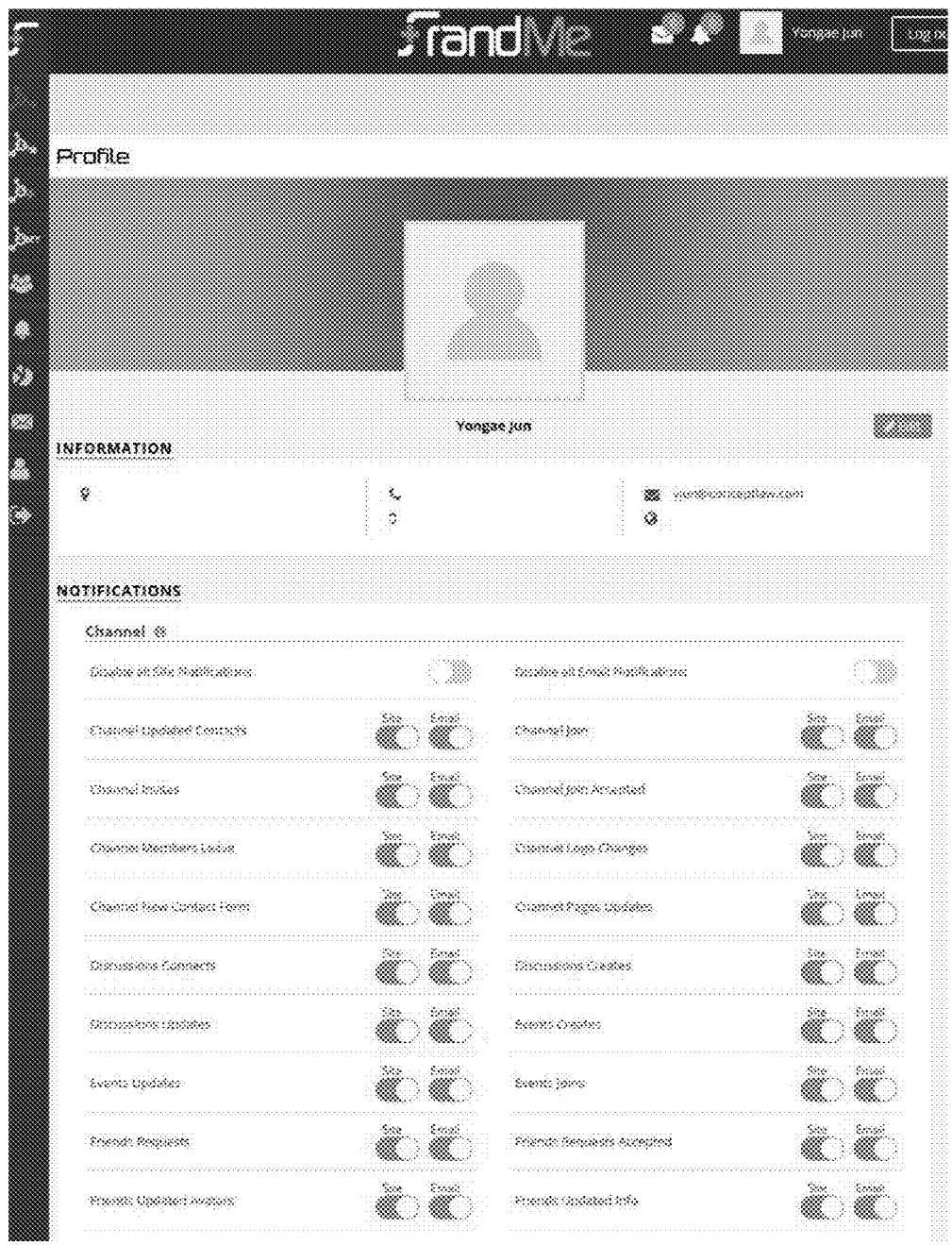
FIG. 23 is a screen shot of the exemplary software application of FIG. 8, depicting a profile page of the exemplary software application in accordance with an embodiment of the present invention.

Referring now to FIG. 23, and returning again to the main page associated generally with the channel owner-developer's account and away from the user application editing interface 1100, there may be a profile page 2300. As can be seen in FIG. 23, the profile page may generally include editable contact information associated with the channel owner-developer and may also include a notifications section 2302. Advantageously, the notifications section 2302 allows the channel owner-developer to manage all or at least a portion of the channel including features associated with notifications. In one embodiment, each feature listed may be selectively turned on or off by the channel owner-developer via, for example, toggle buttons. In one embodiment, the notifications section 2302 allows the channel owner-developer to select what features he/she wants to be notified about and also to select how to receive such notifications, such as, for example, through the channel owner-developer account and/or through a personal email associated with the channel owner-developer's profile.

Figure 24:
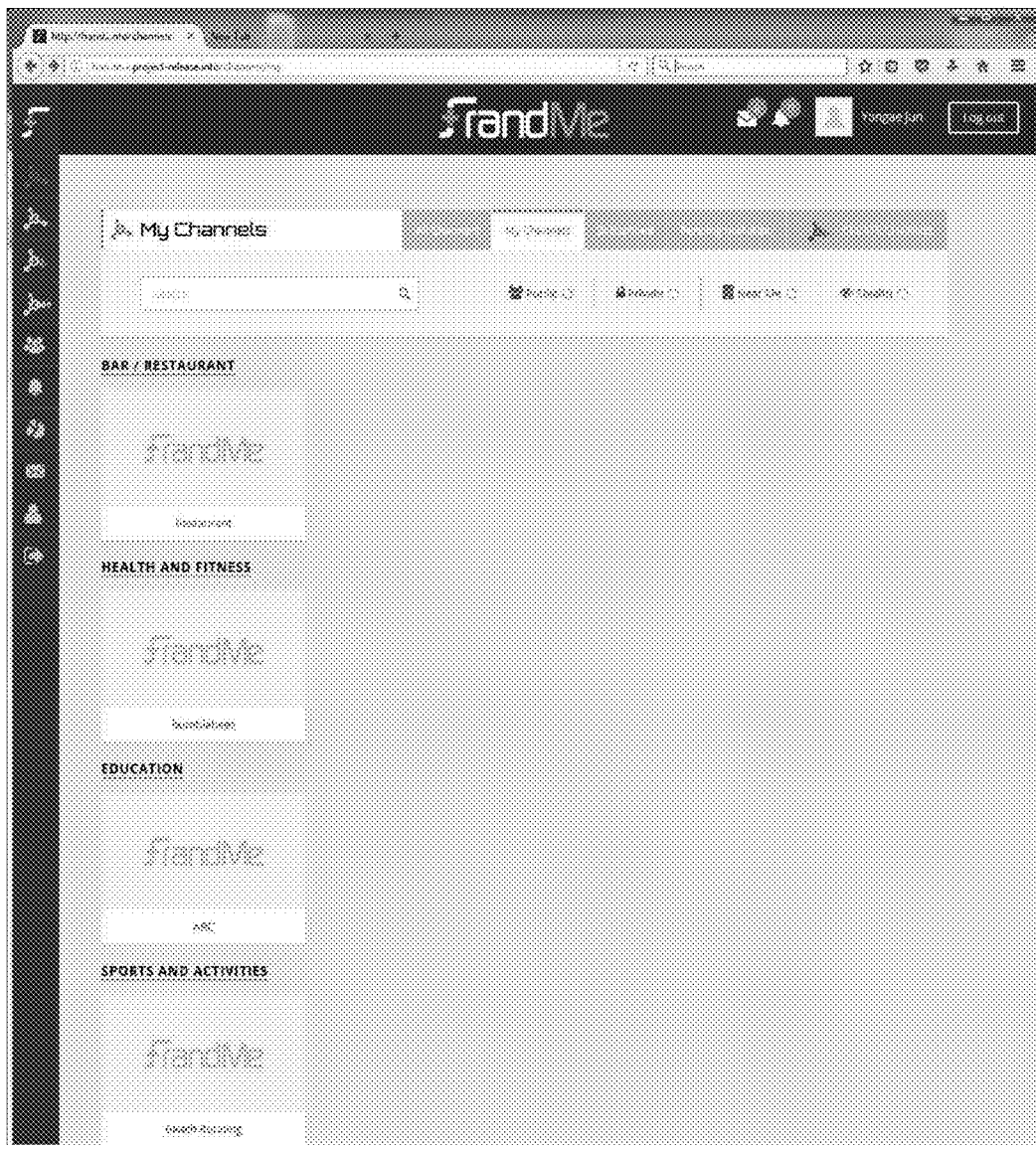
FIG. 24 is a screen shot of the exemplary software application of FIG. 8, depicting a my channels page of the exemplary software application in accordance with an embodiment of the present invention.

Referring now primarily to FIG. 24, there may be provided a "my channels" page 2400 in which the channel owner-developer may view all of his/her channels. Advantageously, end-users having an account with the server 106 can create more than one channel. Each channel may be completely unrelated and associated with completely separate categories of subject matter, or may be similarly related, but perhaps created with different audiences/consumers in mind.

Figure 25:
FIG. 25 is a screen shot of the exemplary software application of FIG. 8, depicting a subscribed channels page of the exemplary software application in accordance with an embodiment of the present invention.
Figure 26:
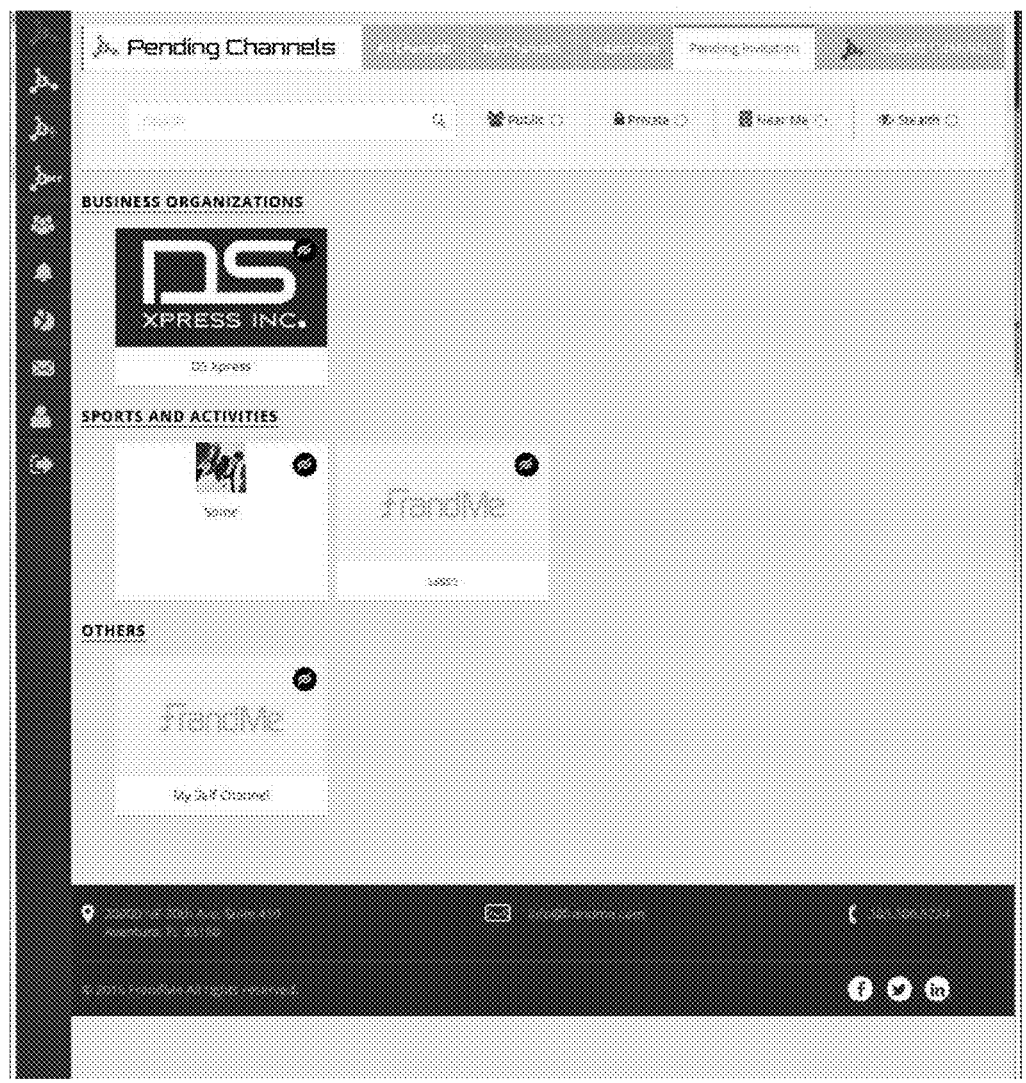
FIG. 26 is a screen shot of the exemplary software application of FIG. 8, depicting a pending invitations page of the exemplary software application in accordance with an embodiment of the present invention.

Referring now primarily to FIG. 25, there may be a subscribe channels page 2500 that may allow the channel owner-developer to view all channels that he/she is a member of, but not necessarily the channel owner-developer of. In FIG. 26, there is illustrated a screenshot of an exemplary pending invitations page 2600 that allows a user to view all the channels that he/she has requested membership to that have not yet been accepted by the respective channel owner-developer.

Figure 4A:
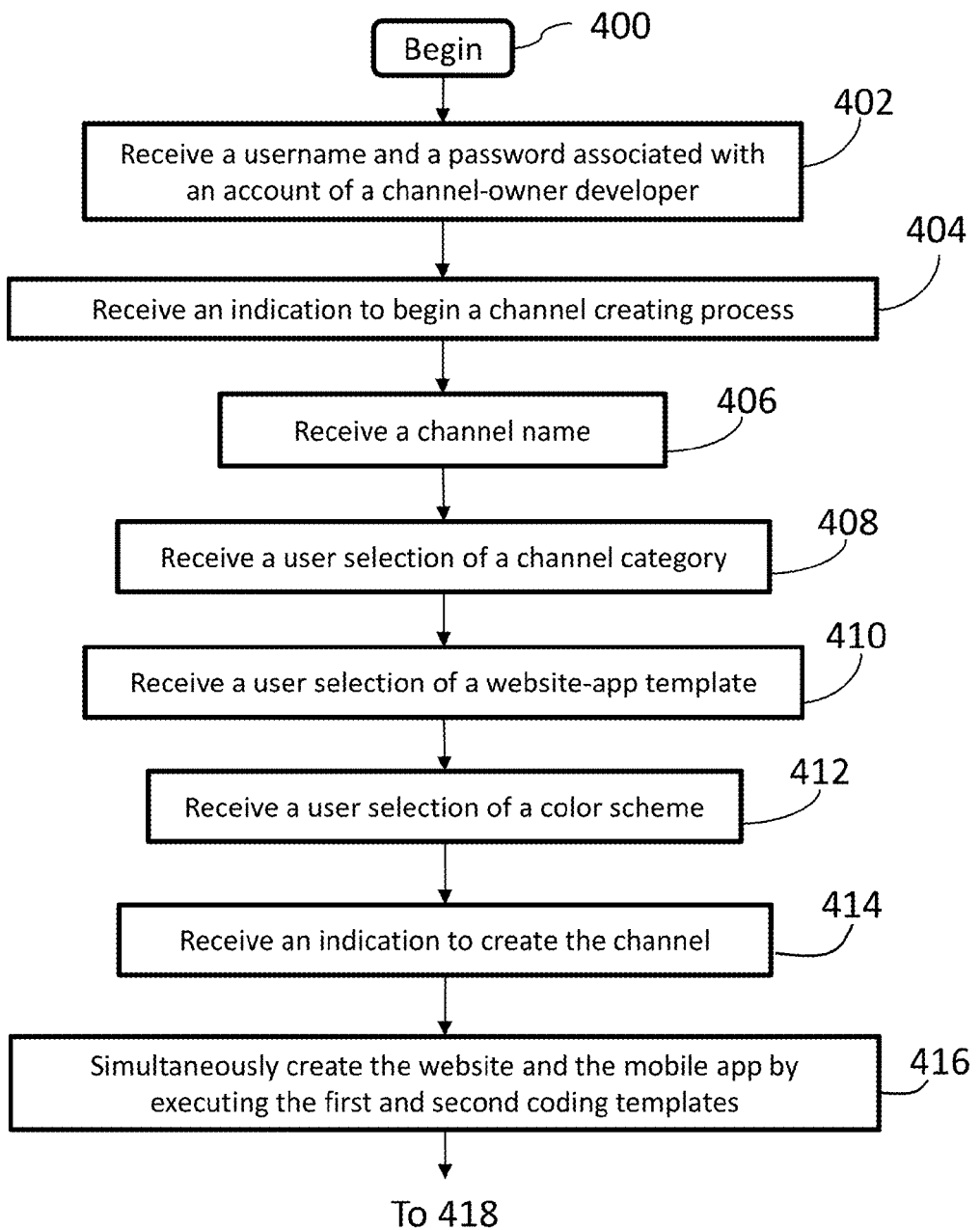
FIG. 4a is a process flow chart representing an exemplary method of creating a channel in accordance with the present invention.

Referring now again to the process flow chart of FIG. 4a, and having described various edits that may be made by the channel owner-developer via the user application editing interface 1100 as well as other features associated with the server 106, the process may proceed to step 422, where the channel owner-developer may publish the channel. In one embodiment, there may be provided a publish your channel button 1408 on, for example, the settings page 1400 associated with the channel, as depicted in FIG. 14. Accordingly, the channel owner-developer may selectively publish the channel when ready. In one embodiment, both the website 704 and the mobile app 706 may be simultaneously published as a result of the channel owner-developer turning on the publish your channel button 1408. In a further embodiment, responsive to such publication feature being turned on, both the website 704 and the mobile app 706 may become simultaneously publicly available for viewing.

Figure 4B:
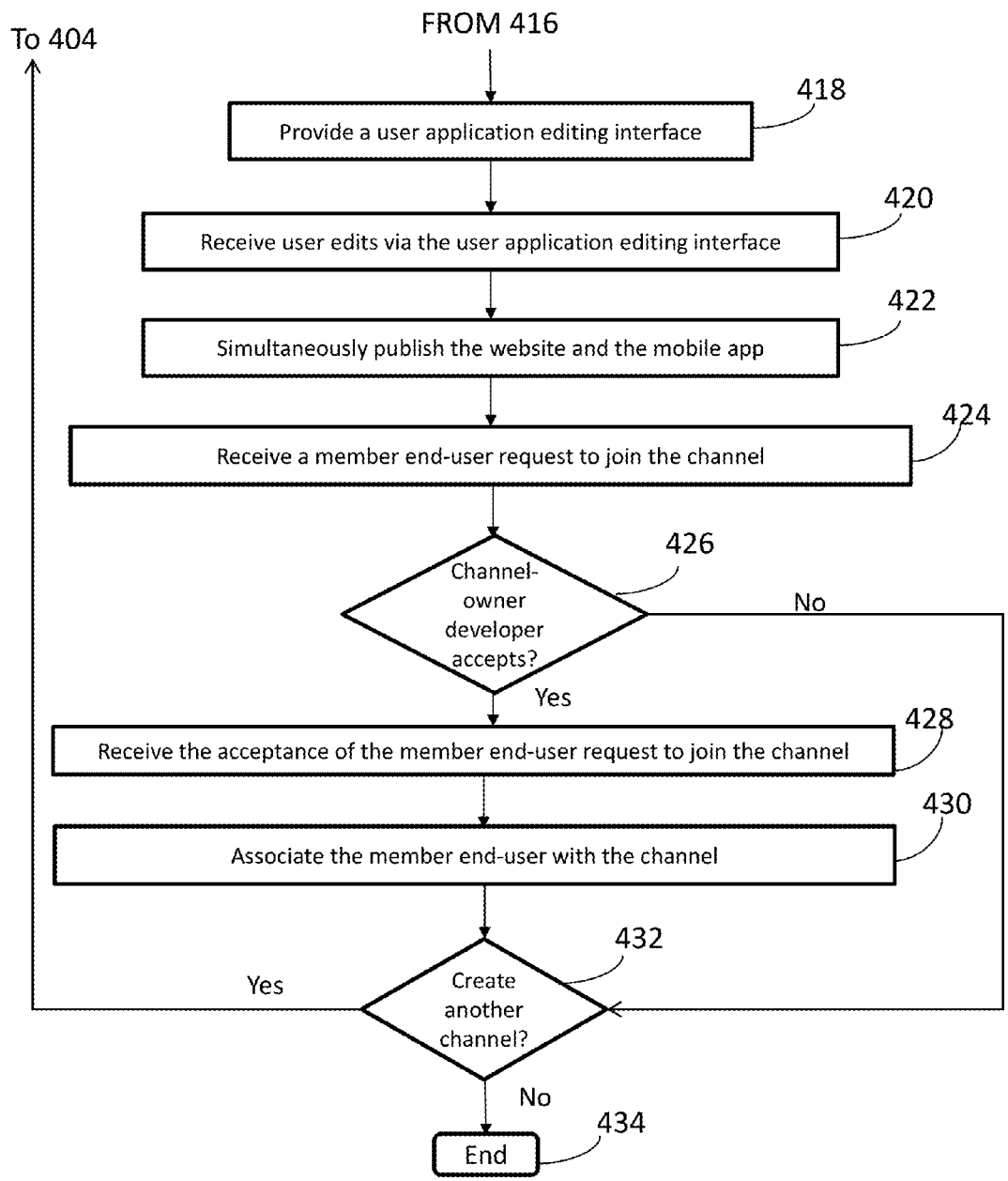
FIG. 4b is a continuation flow chart of the exemplary process shown in FIG. 4a, in accordance with the present invention.
Figure 27:
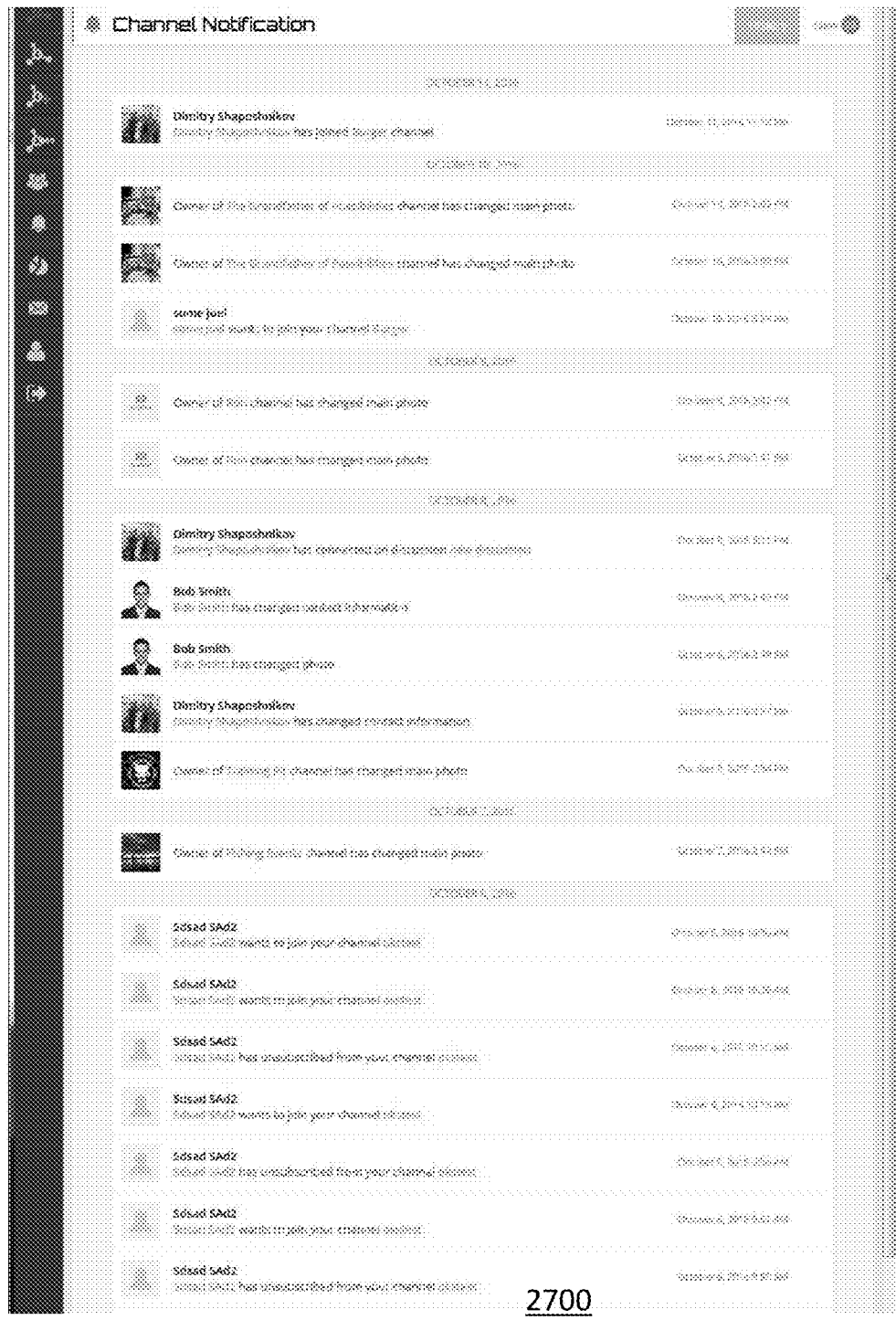
FIG. 27 is a screen shot of the exemplary software application of FIG. 8, depicting a channel notifications page of the exemplary software application in accordance with an embodiment of the present invention.

Continuing on to the continuation process flow chart of FIG. 4b, the process may continue to step 424, where the channel owner-developer, via the server 106, receives a member end-user request to join the channel. As discussed here above, the channel is preferably operably configured to be associated with a plurality of channel member end-users. In one embodiment, the channel may be operably configured to automatically send a notification to each of the plurality of channel member end-users as a result of edits to the channel made by the channel owner-developer. In a further embodiment, such edits results in these notifications to all channel member end-users may be any edits, such as, for example, a change in the background color, adding an event, uploading a new photograph, or any edits that may be made via the user application editing interface 1100. In yet a further embodiment, notifications may be sent, more particularly, responsive to edits made via the user application editing interface 1100, after the channel has been published and/or the publish your channel button 1408 is turned on. FIG. 27 is a screenshot of an exemplary channel notifications page 2700 that allows users to view all notifications associated with channels that they are members of. In a further embodiment, the channel notifications page 2700 may also display all notifications associated with channels that the user is a channel owner-developer of. Such notifications may also include a time and date stamp for when activities associated with the notifications occurred.

In step 426, the channel owner-developer may decide whether to accept or reject member requests. If the answer is "no," the process may continue to step 432. If the answer is "yes," the process may proceed to step 428, where the server 106 receives the acceptance of the member end-user request to join the channel. In step 430, the server 106 associated the user account associated with the member end-user request with the channel, as a channel member. In step 432, the channel owner-developer may decide whether to create yet another channel. Because the method and system of the present invention is preferably intended to permit relatively quick and easy simultaneous creation of website and mobile apps (sometimes in a matter of a few minutes), the channel owner-developer may desire to create multiple channels within a single login session. If the answer is "no," the process may proceed to step 434 where the process ends. If the answer is "yes," the process may return to step 404, where the channel owner-developer beings the channel creating process once again. The steps following step 404, as discussed herein above, may be repeated again to create the second channel (and/or more than two channels) until the process ends at step 434. The first and second coding templates 708 and 710 may be executed by a processor to simultaneously create a second website and a corresponding second mobile app, with inputs that are different than the first channel. For example, the inputs may be a different content container 702 and a different website-app template 700 than used to simultaneously create the website 704 and the mobile app 706 associated with the first channel. Both the first and second channel may be associated with the channel owner-developer account. On a related note, in a further embodiment, both the first and the second channel may be hosted by the server 106. It should be understood that where the term "channel" is used herein, it is implied that the channel includes the website and the corresponding mobile app, unless expressly indicated herein otherwise.

Modifying a Channel

Referring now primarily to FIG. 5, an exemplary process for the channel owner-developer to modify his/her channel is described. The process may begin at step 500 and may immediately proceed to step 502, where the username and the password associated with the account of the channel-owner developer may be received, by the server 106. In other words, the channel-owner developer may login to his/her user account, hosted by the server 106. As shown in FIG. 8, the log-in screen 800 may display user-input fields 802 for inputting the username and/or password information.

After logging in, in step 504, there may be provided the user application editing interface 1100, which may allow the channel owner-developer to edit the channel, after its initial creation. In other words, the instance of the website-app user application editing interface 110 may be opened for editing by the channel owner-developer. In step 506, the channel owner-developer may input user edits via the user application editing interface 1100, similar to the process described with reference to FIG. 4a in step 420, except that presumably the channel includes channel owner-developer content, as opposed to default content, and the channel owner-developer desires to edit/update/add/delete, and/or otherwise simultaneously change the website 704 and the mobile app 706. The editing process may proceed similarly to the editing process described with reference to step 420 and the corresponding screenshots, and therefore will not be expressly repeated in this section.

Edits to the channel via the website-app user application editing interface 1100 may be automatically and/or simultaneously applied to the website 704 and the mobile app 706. In a further embodiment, such edits correspond to the user-inputs, by the channel owner-developer, into at least a portion of the plurality of editing features 1102, 1104, 1106 provided on the website-app user application editing interface 1100.

In one embodiment, there may be provided an editing guide page 2900 (see FIG. 29), similar to the channel creation guide page 1000, depicted in FIG. 11. The editing guide page 2900 may allow the channel owner-developer to edit the initial channel creation steps (discussed with reference to FIG. 4 herein above), by, for example, changing/updating the channel name, changing/updating the category associated with the channel, changing/updating the selected template 700 associated with the channel, and/or changing/updating the channel color scheme.

In a further embodiment, changing/updating the selected template 700 may result in the channel being changed according to a new selected template 2902; however, the user content may stay the same. In other words, selection, by the channel owner-developer, of the second selected template 2902 from the plurality of pre-determined web-app templates 1004 to replace the original selected template 700 may result in the server 106 updating the channel based on the second selected template 2902. In a further embodiment, the server 106 may automatically, without a user input, populate the channel updated with the second selected template 2902 with the user content from the content container 702. This is in contrast to existing website editing interfaces in which a change to the website template requires the developer to re-input all of the user content manually for the new website template. Stated yet another way, the server 106 may receive the selection, by the channel owner-developer, of the second selected template 2902 from the plurality of pre-determined web-app templates 1004 to replace the originally selected template 700 and may automatically include the pre-existing user content (e.g., text, photographs, images, graphics, etc.) of the website 704 and the mobile app 706 in an updated instance of the website 704 and the mobile app 706. In a further embodiment, the website 704 and the mobile app 706 are simultaneously updated based on the second selected template 2902.

One example of at least a portion of the software code that may be executed to implement this feature of automatically populating a new website template with pre-existing user content associated with a previous template for the website, in accordance with embodiments of the present invention, is listed in the Computer Program Listing Appendix.

Of course, in other embodiments, the software code to implement this feature may be different and/or may be written in a different language.

In step 508, as a result of such edits, notifications may automatically be sent to member end-users of the channel notifying such member end-users of changes to the channel. In one embodiment, the notification may briefly describe the edits made by the channel owner-developer.

The process may immediately end at step 510.

Search for a Channel to Join

Referring now primarily to FIG. 6, an exemplary process for end-users to search and join one or more channels associated with the server 106 is described. The process may begin at step 600 and may immediately proceed to step 602, where the username and the password associated with the account of the end-user may be received, by the server 106. In other words, the end-user may login to his/her user account, hosted by the server 106. As shown in FIG. 8, the log-in screen 800 may display user-input fields 802 for inputting the username and/or password information. Alternatively, if the end-user has not yet created an account, the end-user may first click on the "create an account" button 804 to create his/her account and interact with his/her account by, for example, providing various inputs such as profile information and other information to be associated with the account.

Figure 28:
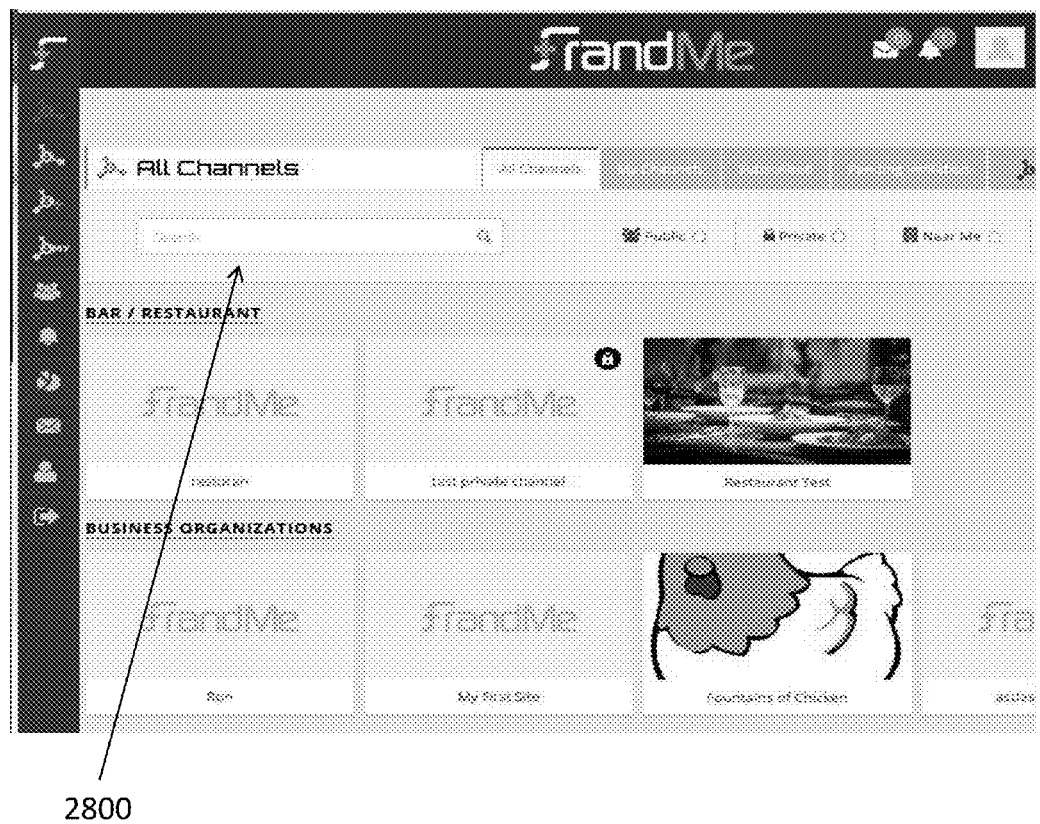
FIG. 28 is a screen shot of the exemplary software application of FIG. 8, depicting a channel search field of the exemplary software application in accordance with an embodiment of the present invention.
Figure 29:
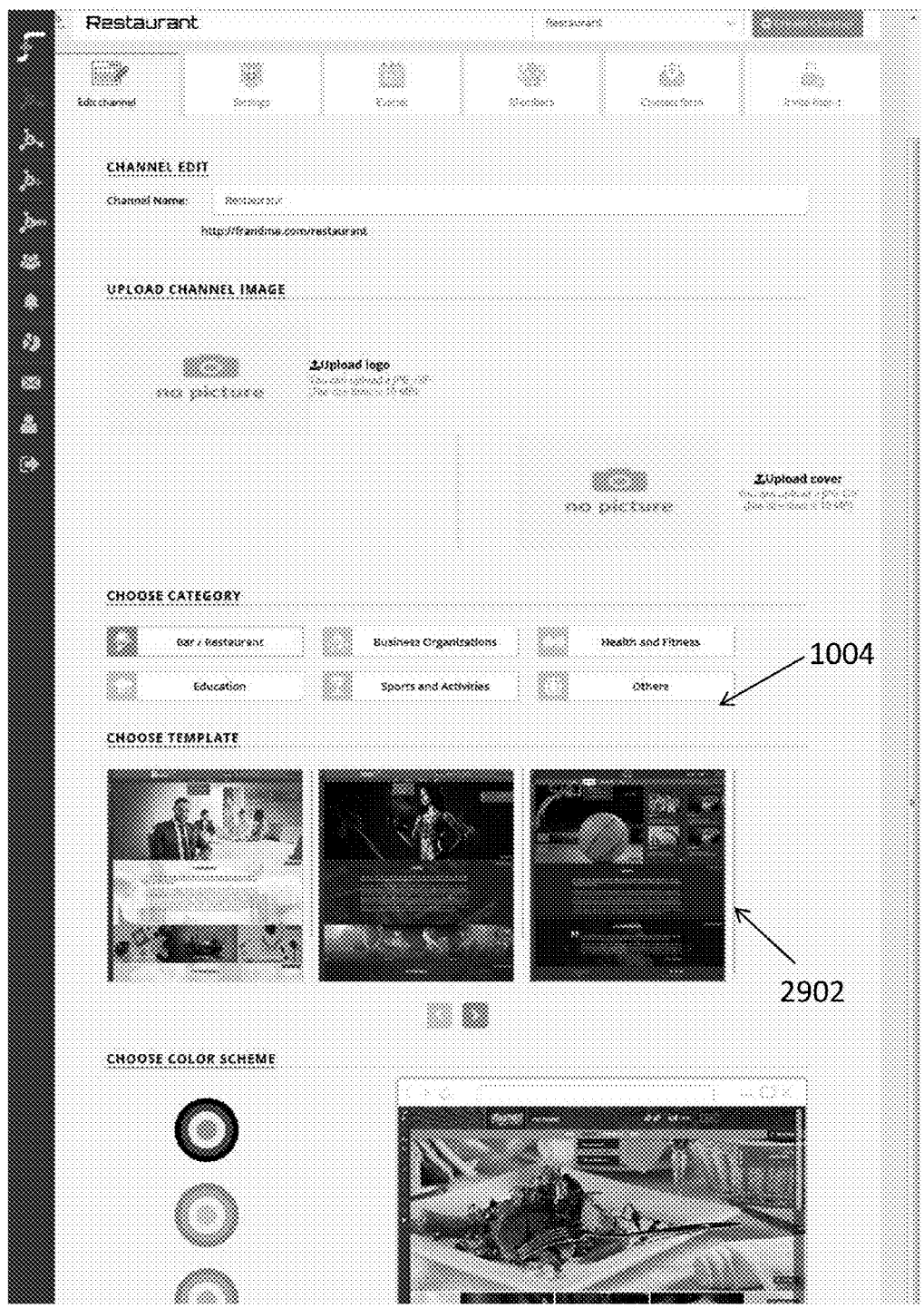
FIG. 29 is a screen shot of the exemplary software application of FIG. 8, depicting an editing channel page of the exemplary software application in accordance with an embodiment of the present invention.

After logging in, in step 604, there may be provided on the home page 900 a channel search field 2800, as shown in FIG. 28. The server 106 may include a search engine, stored at the server 106 or communicatively coupled to the server 106, which may, in step 606, receive user-inputs corresponding to a channel search term input into the channel search field 2800 by the logged-in end user. As a result, in step 608, the search engine may search for channels matching the channel search term. At step 610, the one or more channels corresponding to the channel search term may be displayed to the end-user. In one embodiment, the end-user may request to join the one or more channels found during the channel search. Accordingly, a process for sending a request to the channel owner-developer and receiving either an acceptance or a rejection from the channel owner-developer, as described in steps 424 through step 430 herein above, may proceed.

If an acceptance occurs, the end-user may visit the channel freely with member privileges. In one embodiment, channels may be configured such that the channel remembers where a particular end-user last visited. In other words, the channels may be configured such when an end-user returns to a previously visited channel, the server 106 remembers where the particular end-user last visited within the channel such that the end-user may be automatically returned to the particular location where the end-user left of at the last visit. For example, if the end-user was on a blog page associated with the mobile app 706 just before the end-user exited the channel, such blog page may be automatically displayed to the end-user the next time the end-user returns to the same channel. Advantageously, the end-user is not required to navigate himself/herself back to the page or section of the mobile app 706 that the end-user was previously on, which can be cumbersome.

One example of at least a portion of the software code that may be executed to implement this feature of returning the end-user to the same section of the channel last viewed, in accordance with embodiments of the present invention, is listed in the Computer Program Listing Appendix.

Of course, in other embodiments, the software code to implement this feature may be different and/or may be written in a different language.

The process may end at step 612.

A novel and efficient system and method has been disclosed for simultaneously creating a website and a corresponding mobile app. Embodiments of the present invention provide for such simultaneous website and mobile app creation to be accomplished by a single developer interface such that editing inputs, via the developer interface, are simultaneously applied to both the website and the corresponding mobile app, without requiring separate, independent editing for the website and the mobile app. In addition, embodiments of the present invention include a first coding template operably configured to create a website and a second coding template operably configured to create a corresponding mobile app. Further embodiments of the present invention include creating a channel with the website and the corresponding mobile app by simultaneously executing the first and second coding templates, with a channel owner-selected website-app template as an input to each of the first and second coding templates.

What is claimed is:

1. A computer-implemented method of simultaneously creating a website and an app, the method comprising:

providing, at the at least one server, a first coding template operably configured to create a web site;

providing, at the at least one server, a second coding template operably configured to create a mobile app of a sequence of instructions for execution on a computing system that does not operationally access browser-based HTML webpages that are linked together over the Internet;

receiving, by the at least one server, a selection of a selected template from a plurality of pre-determined website-app templates selectable by a channel owner-developer to create and open for editing an instance of a web site-app user application editing interface;

creating, by the at least one server executing the first coding template, a website based on the on the selected template; and simultaneously with the step of creating the website, creating, by the at least one server executing the second coding template, a mobile app based on the selected template, the website and the mobile app at least partially resembling one another and being simultaneously editable via the website-app user application editing interface.

2. The method in accordance with claim 1, wherein the steps of creating the website and simultaneously creating the mobile app further includes:

automatically hosting, by the at least one server, the website and the mobile app.

3. The method in accordance with claim 1, wherein the steps of creating the website and simultaneously creating the mobile app further includes:

creating, by the at least one server, a channel including the website and the mobile app, the channel operably configured to automatically send a notification to member end-users of the channel as a result of an edit to the channel via the website-app user application editing interface, wherein the edit to the channel is automatically and simultaneously applied to the website and the mobile app included in the channel.

4. The method in accordance with claim 3, wherein:

the website-app user application editing interface displays a plurality of editing features disposed to allow the channel owner-developer to edit the channel via user-inputs into at least one of the plurality of editing features displayed by the website-app user application editing interface; and the edit to the channel that is automatically and simultaneously applied to the website and the mobile app corresponds to the user-inputs into the at least one of the plurality of editing features.

5. The method in accordance with claim 1, further comprising:
receiving, by the at least one server, a channel name from a channel owner-developer; and
wherein the steps of creating the website and simultaneously creating the mobile app further includes:
creating, by the at least one server, a channel including the website and the mobile app; and
associating the channel name to the channel such that the channel name is searchable via a search engine.

6. The method in accordance with claim 1, further comprising:
receiving, by the at least one server, a username and a password associated with an account of the channel owner-developer;
associating the website and the mobile app with the account of the channel owner-developer accessed by the username and the password; and
after the steps of creating the web site and simultaneously creating the mobile app:
receiving, by the at least one server, a selection of a second selected template from the plurality of pre-determined website-app templates selectable by the channel owner-developer to create and open for editing a second instance of a website-app user application editing interface;
creating, by the at least one server executing the first coding template, a second website based on the on the second selected template;
simultaneously with the step of creating the second web site, creating, by the at least one server executing the second coding template, a second mobile app based on the second selected template, the website and the mobile app being simultaneously editable via the second instance of the website-app user application editing interface; and
associating the second website and the second mobile app with the account of the channel owner-developer such that the account of the channel owner-developer is associated with a first channel and a second channel, the first channel including the website and the mobile app and being independent from the second channel, the second channel including the second website and the second mobile app.

7. The method in accordance with claim 1, further comprising:
simultaneously publishing, by the at least one server, the website and the corresponding mobile app.

8. The method in accordance with claim 1, wherein the steps of creating the website and simultaneously creating the mobile app further includes:
creating, by the at least one server, a channel including the website and the mobile app, the channel operably configured to be associated with a plurality of channel member end-users and to automatically send a notification to each of the plurality of channel member end-users as a result of an edit to the channel made by the channel owner-developer via the website-app user application editing interface; and
wherein the website and the mobile app are non-editable by the plurality of channel member end-users.

9. The method in accordance with claim 1, wherein the steps of creating the website and simultaneously creating the mobile app further includes:
creating, by the at least one server, a channel including the web site and the mobile app; and
after the steps of creating the website and simultaneously creating the mobile app, receiving, by the at least one server, an indication to de-select simultaneous website and mobile app creation, wherein a subsequent request to create a second channel results in a creation of one of a second web site and a second mobile app.

10. The method in accordance with claim 1, wherein the steps of creating the website and simultaneously creating the mobile app further includes:
creating, by the at least one server, a channel including the website and the mobile app;
receiving, by the at least one server, an indication of a stealth mode setting from a channel owner-developer of the channel; and
as a result of receiving the indication of the stealth mode setting, configuring, by the at least one server, the website and the mobile app to only be visible to the channel owner-developer and member end-users of the channel with permission to view the channel from the channel owner-developer in the stealth mode setting, wherein a search of the channel via a search engine hosted by the at least one server does not display the channel unless the search is performed by the channel owner-developer or a member end-user of the channel with permission by the channel owner-developer to view the channel in the stealth mode setting.

11. The method in accordance with claim 1, further comprising:
after the steps of creating the website and simultaneously creating the mobile app, receiving, by the at least one server, a selection, by the channel owner-developer, of a second selected template from the plurality of pre-determined web-app templates to replace the selected template and automatically including a pre-existing user content of the website and the mobile app in an updated instance of the website and the mobile app that is simultaneously updated based on the second selected template.

12. A computer-implemented method of simultaneously creating a website and an app, the method comprising:
providing, at the at least one server, a first coding template operably configured to create a web site;
providing, at the at least one server, a second coding template operably configured to create a mobile app of a sequence of instructions for execution on a computing system that does not operationally access browser-based HTML webpages that are linked together over the Internet;
receiving, by the at least one server, a selection of a selected template from a plurality of pre-determined website-app templates selectable by a channel owner-developer to create and open for editing an instance of a web site-app user application editing interface; and
creating, by the at least one server, a channel including a website and a corresponding mobile app that at least partially resemble one another by executing the first code template to create the website and simultaneously executing the second coding template to create the corresponding mobile app with the selected template being an input to each of the first coding template and the second coding template.

13. The method in accordance with claim 12, wherein:
the channel is associated, by the at least one server, with a plurality of channel member end-user that is not a channel owner-developer;
the channel is operably configured to automatically send a notification to the plurality of channel member end-users as a result of an edit to the channel by the channel owner-developer, via the website-app user application editing interface, the edit to the channel being automatically and simultaneously applied to the website and the mobile app included in the channel; and
the web site and the mobile app are non-editable by the plurality of channel member end-users.

14. The method in accordance with claim 12, further comprising:
simultaneously publishing, by the at least one server, the website and the corresponding mobile app.

15. The method in accordance with claim 12, wherein:
the website and the mobile app are operably configured to be simultaneously editable via the website-app user application editing interface.

16. The method in accordance with claim 12, wherein the step of creating the channel including the website and the corresponding mobile app further includes:
receiving, by the at least one server, an indication of a stealth mode setting from the channel owner-developer; and
as a result of receiving the indication of the stealth mode setting, configuring, by the at least one server, the website and the mobile app to only be visible to the channel owner-developer and member end-users of the channel with permission to view the channel from the channel owner-developer in the stealth mode setting, wherein a search of the channel via a search engine hosted by the at least one server does not display the channel unless the search is performed by the channel owner-developer or a member end-user of the channel with permission by the channel owner-developer to view the channel in the stealth mode setting.

17. The method in accordance with claim 12, further comprising:
after the steps of creating the website and simultaneously creating the mobile app, receiving, by the at least one server, a selection, by the channel owner-developer, of a second selected template from the plurality of pre-determined web-app templates to replace the selected template and automatically including a pre-existing user content of the website and the mobile app in an updated instance of the website and the mobile app that is simultaneously updated based on the second selected template.

18. A system for simultaneously creating a website and an app, the system comprising:
at least one server including at least one memory and at least one processor, the at least one memory storing a first coding template operably configured to create a website, a second coding template operably configured to create a mobile app of a sequence of instructions for execution on a computing system that does not operationally access browser-based HTML webpages that are linked together over the Internet, and a plurality of pre-determined website-app templates and the at least one processor operably configured to execute computer instructions for:
receiving a selection of a selected template from a plurality of pre-determined website-app templates selectable by a channel owner-developer to create and open for editing an instance of a web site-app user application editing interface; and
creating a channel including the website and the corresponding mobile app that at least partially resemble one another by executing the first code template to create the website and simultaneously executing the second coding template to create the corresponding mobile app with the selected template being an input to each of the first coding template and the second coding template.

19. The system in accordance with claim 18, wherein:
the website and the mobile app are operably configured to be simultaneously editable via the website-app user application editing interface.

20. The system in accordance with claim 18, wherein:
the at least one server is operably configured to simultaneously publish the website and the corresponding mobile app.

\* \* \* \* \*